US011126758B2

United States Patent
Colas et al.

(10) Patent No.: US 11,126,758 B2
(45) Date of Patent: Sep. 21, 2021

(54) AUTOMATIC AIRFOIL AND WING DESIGN BASED ON DYNAMIC MODELING OF STRUCTURAL AND AERODYNAMIC PERFORMANCE

(71) Applicant: Facebook, Inc., Menlo Park, CA (US)

(72) Inventors: Dorian Frederic Marie Colas, Seattle, WA (US); Vishvas Samuel Suryakumar, Redwood City, CA (US); Nicholas Roberts, Seattle, WA (US)

(73) Assignee: FACEBOOK, INC., Menlo Park, CA (US)

( * ) Notice: Subject to any disclaimer, the term of this patent is extended or adjusted under 35 U.S.C. 154(b) by 645 days.

(21) Appl. No.: 15/933,165

(22) Filed: Mar. 22, 2018

(65) Prior Publication Data
US 2019/0294755 A1    Sep. 26, 2019

(51) Int. Cl.
*G06F 30/15*       (2020.01)
*B64C 3/14*        (2006.01)
(Continued)

(52) U.S. Cl.
CPC ............... *G06F 30/15* (2020.01); *B64C 3/14* (2013.01); *G06F 30/17* (2020.01); *G06F 30/23* (2020.01);
(Continued)

(58) Field of Classification Search
CPC .......... G06F 30/15; G06F 30/23; G06F 30/17; G06F 2111/04; G06F 2111/06; B64C 3/14
(Continued)

(56) References Cited

U.S. PATENT DOCUMENTS

| | | |
|---|---|---|
| 5,926,399 A | 7/1999 | Berkooz et al. |
| 8,419,373 B1 | 4/2013 | Fukami |
| | (Continued) | |

FOREIGN PATENT DOCUMENTS

| | | |
|---|---|---|
| EP | 2 275 671 A1 | 1/2011 |
| EP | 3 499 391 A1 | 6/2019 |
| WO | WO 2019/182620 | 9/2019 |

OTHER PUBLICATIONS

Lim_2014 (Wing Design Optimization of a Solar-HALE Aircraft Int'l J. of Aeronautical & Space Sci. 15(3), 219-231 (2014) (Year: 2014).*

(Continued)

*Primary Examiner* — Brian S Cook
(74) *Attorney, Agent, or Firm* — Keller Jolley Preece

(57) ABSTRACT

Systems, methods, and non-transitory computer-readable media are disclosed for automatically generating an improved aircraft wing by modifying quantitative design variables of one or more airfoils based on joint analysis of aerodynamic and structural performance. In particular, the disclosed systems determine cross-sectional aerodynamic and structural performance metrics for identified airfoils. Based on cross-sectional metrics, the disclosed systems iteratively determine wing aerodynamic performance and deformation metrics across a span of the wing until arriving at an equilibrium deformation and corresponding aerodynamic metric. The disclosed systems can repeatedly analyze the aero-structural metrics for different quantitative design variables to explore a design space and generate an improved wing design while improving aerodynamic and structural performance.

20 Claims, 11 Drawing Sheets

(51) Int. Cl.
*G06F 30/17* (2020.01)
*G06F 30/23* (2020.01)
*G06F 111/04* (2020.01)
*G06F 111/06* (2020.01)

(52) U.S. Cl.
CPC ....... *G06F 2111/04* (2020.01); *G06F 2111/06* (2020.01)

(58) Field of Classification Search
USPC .......................................................... 703/1
See application file for complete search history.

(56) References Cited

U.S. PATENT DOCUMENTS

| | | |
|---|---|---|
| 8,527,247 B1 | 9/2013 | Wilson et al. |
| 2009/0312989 A1 | 12/2009 | Dimitriadis |

OTHER PUBLICATIONS

Muthirevula_2017 (Cross-Sectional Stiffness Properties of Complex Drone Wings 2016 Virginia Polytechnic and State University). (Year: 2017).*

Leutenegger_2011 (Solar Airplane Conceptual Design and Performance Estimation What Size to Choose and What Endurance to Expect, J Intell Robot Syst (2011) 61:544-561). (Year: 2011).*

Romeo_2014 (Multi-Objective Optimization of the Composite Wing Box of Solar Powered Hale UAV, 29th Congress of the International Council of the Aeronautical Sciences, St. Petersburg, Russia: Sep. 7-12, 2014). (Year: 2014).*

Deluca_2004 (Experimental Investigation into the Aerodynamic Performance of Both Rigid and Flexible Wing Structured Micro-Air-Vehicles, Thesis Air Force Institute of Technology, 2004) (Year: 2004).*

Sadraey_2012 (Aircraft Design a Systems Engineering Approach, Wiley 2013). (Year: 2013).*

Office Action as received in European Application 18196283.8 dated May 19, 2020.

International Search Report & Written Opinion as received in PCT/US2018/024390 dated Oct. 25, 2018.

Brian J Morrisey: "Multidisciplinary Design Optimization of an Extreme Aspect Ratio HALE UAV" In: "California Polytechnic State University", Jun. 17, 2009 (Jun. 17, 2009).

Eric Michael Mckee: "Dissertations and Theses Novel Airframe Design for the Dual-Aircraft Atmospheric Platform Flight Concept Scholarly Commons CitationNovel Airframe Design for the Dual-Aircraft Atmospheric Platform Flight Concept" (2012). Dissertations and Theses, Dec. 1, 2012 (Dec. 1, 2012), Retrieved from the Internet: URL:https://commons.erau.edu/cgi/viewcontent.cgi?article=1103&context=edt [retrieved on Mar. 11, 2019].

Extended European Search Report as received in European application 18196283.8, dated Mar. 21, 2019.

G. Carrier: "Multiobjective evolutionary computation for supersonic wing-shape optimization", ECCOMAS 2004, Jul. 24, 2004 (Jul. 24, 2004), XP055566710, Jyvaskyla (Finlande) Retrieved from the Internet: URL:https://www.researchgate.net/profile/Gerald_Carrier/publication/256842467_Multi-disciplinary_optimisation_of_a_supersonic_transport_aircraft_wing_planform/links/0deec5245cf6143bd7000000/Multi-disciplinary-optimisation-of-a-supersonic-transport-aircraft-wing-planform.pdf?origin=publication_detail [retrieved on Mar. 8, 2019].

G. Romeo et al: "Multi-Objective Optimization of the Composite Wing Box of Solar Powered HALE UAV", Proceedings of 29th Congress of the International Council of Aeronautical Sciences, Sep. 7, 2014 (Sep. 7, 2014), pp. 1-12; Retrieved from the Internet: URL:https://www.researchgate.net/profile/Francesco_Danzi/publication/288471672_Multi-objective_optimization_of_the_composite_wing_box_of_solar_poweredhaleUAV/links/5a034892aca2721d41864be2/Multi-objective-optimization-of-the-composite-wing-box-of-solar-powered-hale-UAV.pdf?origin=publication_detail [retrieved on Mar. 8, 2019].

Jaehoon Lim et al: "Wing Design Optimization of a Solar-HALE Aircraft", International Journal of Aeronautical and Space Sciences, vol. 15, No. 3, Sep. 30, 2014 (Sep. 30, 2014), pp. 219-231.

Seok-Ho Son et al: "Multidisciplinary Design Optimization fof Long-Endurance Unmanned Aerial Vehicle Wing", International Journal of Aeronautical and Space Sciences, Sep. 1, 2016 (Sep. 1, 2016), pp. 423-431, Retrieved from the Internet: URL:https://epo.summon.serialssolutions.com/2.0.0/link/0/eLvHCXMwtV1Lj9MwELZY7QEuCAQSBVbygZyCpfiRh4_ZNNvd UoREu8CKQ-Qkzm4FJCilHvrvGSe0mwoJwYFLNJg6rZ T5PP5mNONB6120aC2rRhAeSk1EwgQpS861j1VZsSaoK276nW 8ysVnEHxdmWsM4t0Sg -6-WBh3Y2nTO_o013Y-CAmSw0TzB6vD8K7t_NrH_vK_L8D-AP hhGy2Hckl_1bW3JG_r3X3fK3CdfvJ3fbrgYn11uKF [retrieved on Mar. 8, 2019.

* cited by examiner

AUTOMATIC AIRFOIL AND WING DESIGN BASED ON DYNAMIC MODELING OF STRUCTURAL AND AERODYNAMIC PERFORMANCE

BACKGROUND

Recent years have seen significant development in aircraft design. For example, developers have recently created high-altitude, lone-endurance aircraft to provide improved digital communication capabilities. For instance, developers have generated solar-powered, high-altitude, long-endurance aircraft that provide internet connectivity in regions without other viable means of internet access. Stringent operational constraints for such implementations, however, place demanding requirements on every aircraft subsystem. For instance, the need for long endurance requires superior aerodynamic performance (e.g., high lift to drag ratios) at low Reynolds numbers enabled by efficient light-weight structures. These high-performance requirements often lead to flexible and thin wings resulting in aerodynamic deformities such as twisting and deflection resulting in failure of one or more subsystems of the aircraft.

As aircraft design moves into this challenging new frontier, the shortcomings of conventional aircraft design systems have become increasingly apparent. Indeed, inflexibility, computational requirements, and/or simplified design models utilized by conventional design systems make new aircraft designs difficult and expensive to generate. For example, some conventional aircraft design systems utilize simplified models for general aircraft component layout design. Although such systems provide general tools for preliminary design, they fail to provide accurate analysis of the various interactive disciplines that impact aircraft functionality. For instance, such systems generally fail to effectively account for aerodynamic forces on an aircraft and resulting physical deformations caused as a result of the applied aerodynamic forces.

Other conventional aircraft design systems utilize empirical data to generate aircraft designs and then utilize individual, high-fidelity, computationally intensive tools to test various components of the aircraft. For example, after designing an aircraft based on empirical data (e.g., design charts, historical designs, or similar data), conventional aircraft design systems utilize finite element analysis to determine structural strength of a wing. Although these tools are useful in testing performance characteristics of individual components of an existing design, they are computationally intensive and impede flexibility in aircraft design. Indeed, individual tools for analyzing individual components of an aircraft can easily exhaust the computing resources of many conventional computing devices.

These and other problems exist with regard to conventional aircraft design systems.

BRIEF SUMMARY

One or more embodiments described herein provide benefits and/or solve one or more of the foregoing and other problems in the art with systems, methods, and non-transitory computer readable media for automatically generating wing models for aircrafts by modifying quantitative design variables based on an analysis of aerodynamic and structural performance of an aircraft. In particular, the disclosed systems can utilize a lightweight optimization framework to determine cross-sectional variables for a wing of an aircraft that improve aerodynamic functionality of the aircraft and reduce overall aircraft weight while satisfying aero-structural constraints. For example, the disclosed systems can iteratively determine a wing aerodynamic performance metric and a deformation metric over a span of the aircraft wing. From this analysis, the disclosed systems can identify a variety of aero-structural performance metrics of the wing under flight conditions. Based on these aero-structural performance metrics, the disclosed systems can then modify the quantitative design variables to explore the design space and generate an improved wing design.

To illustrate, in one or more embodiments, the disclosed systems identify an input set of quantitative design variables of an airfoil corresponding to an aircraft wing. The disclosed systems can then determine a cross-sectional aerodynamic performance metric and a cross-sectional stiffness of the cross-section of the aircraft wing corresponding to the airfoil. The disclosed systems can further iteratively determine aerodynamic and structural metrics across a span of the wing based on the cross-sectional aerodynamic performance metric and the structural stiffness until converging to generate an equilibrium deformation metric and an equilibrium aerodynamic metric of the aircraft wing. The disclosed systems can then generate a modified airfoil by utilizing an optimization algorithm to modify digital design variables of the input airfoil to minimize a weight of the aircraft wing while maintaining structural and aerodynamic constraints of the wing.

The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description refers to the accompanying drawings, in which.

DETAILED DESCRIPTION

Figure 1:
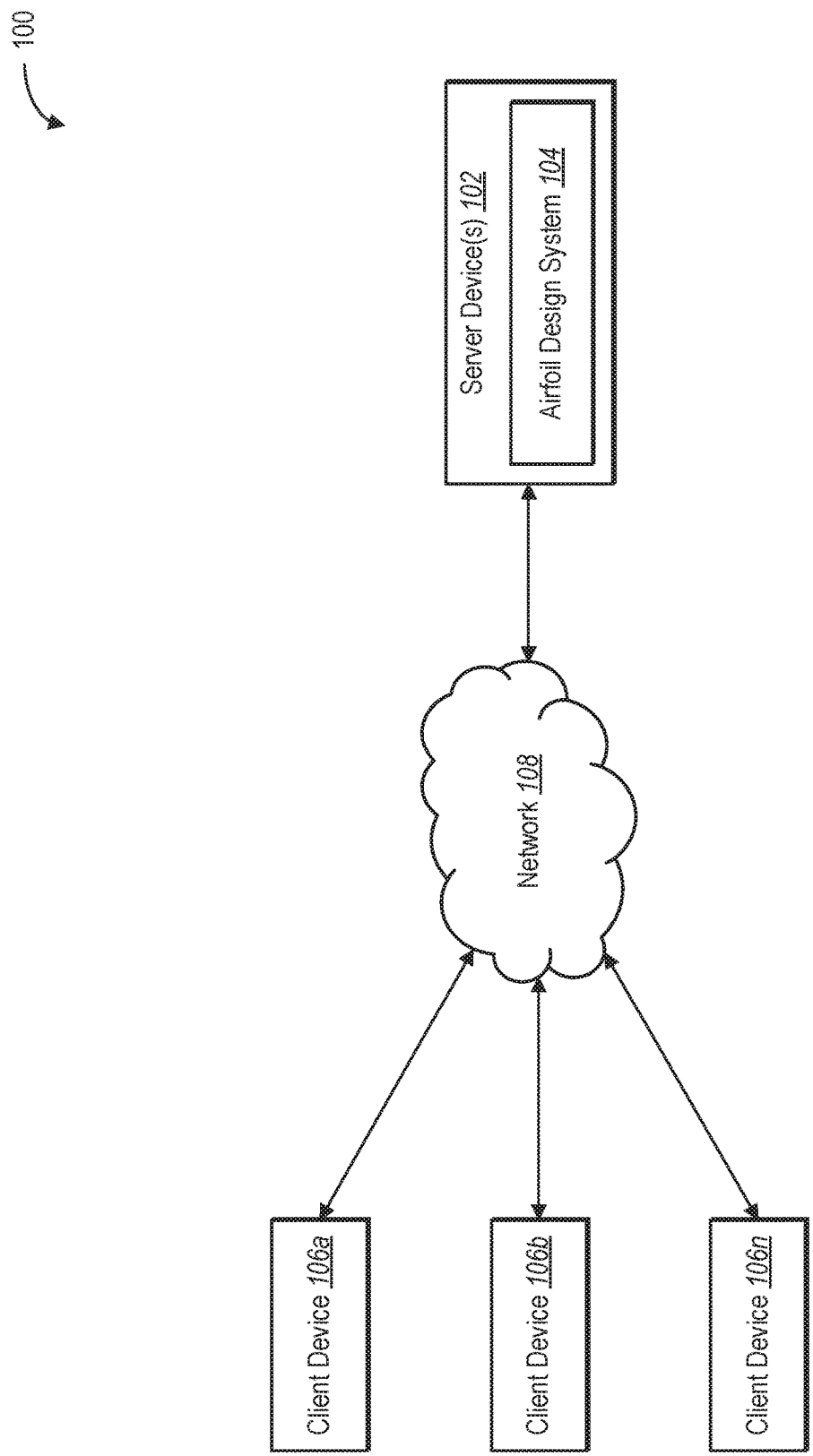
FIG. 1 illustrates an example environment in which the airfoil design system can operate in accordance with one or more embodiments.

One or more embodiments of the present disclosure include an airfoil design system that generates a model aircraft wing by modifying quantitative design variables of one or more airfoils based on joint analysis of aerodynamic and structural performance. In particular, the airfoil design system can automatically generate a modified wing design by modeling detailed trade-offs between airfoil shape versus structural performance and weight. For instance, in one or more embodiments, the airfoil design system utilizes input design variables to determine cross-sectional aerodynamic and structural performance metrics for airfoils. Based on these cross-sectional performance metrics for the airfoils, the airfoil design system can iteratively determine wing aerodynamic performance and deformation metrics (across the span of the wing). In this manner, the airfoil design system can model the wing under performance loads to determine various aero-structural performance metrics. In one or more embodiments, the airfoil design system repeatedly analyzes these aero-structural performance metrics for different quantitative design variables to explore the design space and generate an improved wing design that reduce weight while maintaining or improving aerodynamic and structural performance.

To illustrate, in one or more embodiments, the airfoil design system identifies an input set of quantitative design variables of an input airfoil (or multiple input airfoils) corresponding to an aircraft wing. The airfoil design system analyzes the quantitative design variables to determine a cross-sectional aerodynamic performance metric of the input airfoil and a cross-sectional structural stiffness of the input airfoil. Based on these cross-sectional properties, the airfoil design system can then analyze performance across the wing. For example, the airfoil design system can iteratively determine a wing aerodynamic performance metric and a deformation metric over the span of the wing until converging to generate an equilibrium deformation metric and equilibrium wing aerodynamic performance metric. The airfoil design system can further generate a modified airfoil by modifying the input set of quantitative design variables of the input airfoil based on the cross-sectional structural stiffness and the equilibrium aerodynamic performance metric of the aircraft wing.

As just mentioned, the airfoil design system can identify an input set of quantitative design variables that define an input airfoil of an aircraft wing. In one or more embodiments, the airfoil design system identifies quantitative design variables for multiple airfoils at stations (e.g., locations) along a span of the wing. For example, the airfoil design system can identify an input set of quantitative design variables based on user input of a variables and stations or by analyzing an aircraft model that includes a base wing model. The airfoil design system can also identify an input set of quantitative design variables from an earlier iteration of a design loop of the airfoil design system.

Upon identifying an input set of quantitative design variables, the airfoil design system can generate one or more airfoils and determine cross-sectional performance metrics of the airfoils. For example, the airfoil design system can generate an airfoil model based on the input set of quantitative design variables utilizing a lightweight airfoil performance algorithm. The airfoil design system can then utilize the airfoil performance algorithm to determine a cross-sectional aerodynamic performance metric of a cross section of the aircraft wing corresponding to the airfoil and a cross-sectional structural stiffness of the cross-section of the aircraft wing corresponding to the airfoil.

As mentioned above, the airfoil design system can also utilize these cross-sectional performance metrics of the airfoils to determine performance metrics over the span of the wing. For example, in one or more embodiments, the airfoil design system can determine a wing aerodynamic performance metric (e.g., load, pitching moment, lift, drag, and/or polar) and a deformation metric (e.g., deflection or twist) over a span of the wing based on the cross-sectional aerodynamic performance metric(s) and cross-sectional structural stiffness(as) for the airfoils. In many circumstances, changes in wing aerodynamic performance can impact deformation. Moreover, changes in deformation can impact the wing aerodynamic performance. Accordingly, in one or more embodiments, the airfoil design system iteratively determines the wing aerodynamic performance metric and the deformation metric until convergence to equilibrium metrics.

Upon determining these equilibrium metrics, the airfoil design system can further determine a structural response of the wing. For example, in one or more embodiments, the airfoil design system determines a specific strength of the wing based on a structural stiffness of the wing (e.g., stiffness at the root or tip) and further based on the equilibrium wing aerodynamic performance metric (e.g., a distributed load).

As mentioned above, the airfoil design system can modify quantitative design variables to generate an improved wing based on determined aero-structural performance metrics. For example, in one or more embodiments, the airfoil design system utilizes an optimization algorithm having one or more objectives subject to one or more constraints corresponding to aero-structural performance metrics (e.g., threshold pitching moment, threshold robustness, threshold strength and/or stiffness). In particular, the airfoil design system can utilize the optimization algorithm to modify one or more quantitative design variables to obtain the objective of reducing weight of the wing while applying constraints that enforce maintaining or improving aerodynamic performance.

In one or more embodiments, the airfoil design system utilize a unique measure of weight (as an objective within the optimization algorithm) that efficiently analyzes both structural and aerodynamic performance. In particular, in one or more embodiments the airfoil design system utilizes a measure of weight that comprises both a structural weight and a performance weight. To illustrate, the airfoil design system can minimize a weight measure that indicates both structural weight (e.g., weight of the wing) and a performance weight that reflects the amount of energy (e.g., fuel or battery weight) to perform a flight mission. By applying an optimization algorithm to the combined structural weight and performance weight subject to one or more constraints, the aircraft management system can efficiently balance trade-offs between airfoil shape, structural performance, and weight.

Furthermore, in one or more embodiments, the airfoil design system operates in conjunction with an aircraft design system (i.e., a system for generating and/or modifying an overall design of an aircraft model). To illustrate, in one or more embodiments, the airfoil design system receives a base wing (with a base airfoil) from the aircraft design system. The airfoil design system can generate a modified wing design and provide the modified wing design to the aircraft design system to generate an improved overall aircraft model. Indeed, in one or more embodiments the airfoil design system applies constraints that ensure that the modified wing design can replace the base wing design of the aircraft model.

The airfoil design system provides a variety of advantages and benefits over conventional systems. For example, the airfoil design system can generate airfoil designs based on accurate physics models. Indeed, as mentioned above, in order to quickly and accurately explore the design space, the disclosed systems can employ first-order physics models that retain sufficient engineering fidelity to capture the dominant interactions and trends among various disciplines (e.g., without delving into second or third-order physics effects that demand excessive computational power). For instance, the airfoil design system can consider coupled interactions between aerodynamic and structural performance to accurately model airfoil and wing performance. For example, the airfoil design system can model aerodynamic performance across all Reynolds numbers, structural detail (composites) and integrated mission performance at a fidelity-level to design wings and corresponding airfoils. Accordingly, the airfoil design system can rapidly downselect potential design configurations (often identifying a near-optimal solution within two or three iterations), while capturing sufficient engineering fidelity to generate realistic designs that enable shorter engineering and development cycles.

In addition to accurately modeling performance of wing and airfoil designs, the airfoil design system can also efficiently generate airfoils to avoid overtaxing computing systems. Indeed, as outlined in greater detail below, the airfoil design system utilizes a computationally-efficient framework that interconnects various light-weight tools of adequate fidelity to capture trends and interactions. The airfoil design system can also implement a sizing and data flow logic so that only a small combination of design variables is utilized to adequately parse the design space. Accordingly, the airfoil design system can capture low Reynolds number aerodynamics, composite structures, integrated vehicle performance and their interactions while improving computational efficiency.

Furthermore, the airfoil design system can also improve flexibility of airfoil design by allowing for large-scale variations of design variables based on accurate, efficient analysis of changes to aerodynamics and structure. Indeed, the airfoil design system can be easily implemented at the conceptual stage where candidate designs need to be quickly evaluated in order to rapidly explore the design space. Thus, the airfoil design system can simultaneously consider and implement large-scale modifications to various design variables to generate an improved airfoil that satisfies performance constraints.

Moreover, as mentioned above, the airfoil design system can also operate in conjunction with an aircraft design system to improve efficiency, flexibility, and accuracy of overall aircraft design. Indeed, in one or more embodiments, the airfoil design system determines modified variables in view of one or more structural and aerodynamic constraints that reduce a weight of the wing while maintaining or increasing aerodynamic performance, thereby enabling implementation of the modified wing within an overall design for the aircraft.

As illustrated by the foregoing discussion, the present disclosure utilizes a variety of terms to described features and benefits of the airfoil design system. Additional detail is now provided regarding the meaning of these terms.

As used herein, the term "airfoil" refers to a cross-section of a wing. In particular, an airfoil includes a cross-section at a particular location along a span of the wing. For instance, an airfoil refers to a cross-section of a wing including materials, surface features, and quantitative design variables descriptive of one or more dimensions of the cross-section. For example, a root airfoil can refer to a cross-section of the wing at or near a root of the wing while a tip airfoil refers to a cross-section of the wing at or near a tip of the wing.

As used herein, the term "modified airfoil" refers to a modified version of an airfoil based on one or more modified quantitative design variables and/or parameters of the wing or airfoil. For example, a modified airfoil can refer to an airfoil constructed (e.g., using XFOIL) based on modified quantitative design variables output from an optimization algorithm at one or more iterations for improving the wing design. In addition, the modified airfoil can refer to a final airfoil designed after multiple iterations of optimizing the wing design. As used herein, the term "base airfoil" refers to an initial (or starting) airfoil. In particular, a "based airfoil" refers to an input parameter utilized in a first iteration of a design loop to generate a modified airfoil.

An airfoil can include a number of quantitative design variables descriptive of a shape and/or design of a given airfoil. As used herein, a "quantitative design variable" (or "digital design variable" or "airfoil variable") refers to elements, features, or factors of one or more airfoils of an aircraft wing. In particular, "quantitative design variables" includes elements, features, or factors of an airfoil (or wing) that the aircraft design system can modify, vary, or change (e.g., change utilizing an optimization algorithm). For example, in one or more embodiments, quantitative design variables include a camber (e.g., a maximum camber), a thickness (e.g., a maximum thickness), a leading edge radius, wing twists, and one or more positions along a chord of the airfoil corresponding to a maximum camber and/or a maximum thickness of the airfoil. Quantitative design variables can further include structural variables including materials, plies (e.g., a number and/or thickness of plies), tapers, and web thickness of the airfoil. As will be described in further detail below, the airfoil design system can modify a wing design by modifying quantitative design variables of one or more airfoils at different positions over a span of the wing.

As used herein, the term "cross-sectional aerodynamic performance metric" refers to one or more metrics that characterize aerodynamic performance of an airfoil based on quantitative design variables and parameters of the airfoil. For example, a cross-sectional aerodynamic performance metric includes aerodynamic metrics determined using an airfoil performance algorithm (e.g., XFOIL) including, by way of example, a cruise lift coefficient, profile drag coefficient, and/or pitching moment coefficient. The cross-sectional aerodynamic performance metric can further include aerodynamic metrics for an airfoil under different flight conditions and across all (high or low) Reynolds numbers.

As used herein, the term "structural stiffness" or "cross-sectional structural stiffness" refers to a metric of rigidity of a wing at a position along a span of the wing. The structural stiffness can refer to a bending stiffness and/or a torsional stiffness of the wing at a corresponding location along the span of the wing (e.g., at a position or station of an airfoil). Cross-sectional structural stiffness can also refer to a specific stiffness (e.g., a stiffness per unit weight or mass). Further, the structural stiffness may be based on material properties of materials that make up the wing including surface laminates, plies, and other components of the wing structure.

As used herein, the term "wing aerodynamic performance metric" refers to one or more metrics that characterize an aerodynamic performance across a span of the wing. For example, a wing aerodynamic performance metric may refer to a distribution of lift and/or drag across the span of the wing, an aerodynamic load (e.g., a distributed load) over the span of the wing, a measure of various forces applied over the surface of the wing, lift, drag, wing polar (e.g., ratio or other comparison of lift to drag) or a pitching moment on the wing.

As used herein, the term "deformation metric" refers to a measure of a deformation of a wing caused as a result of aerodynamic forces being applied to the surface of the wing (e.g., an aerodynamic load). In particular, a deformation metric can include deflections or twists of a wing. For example, deformation metrics can refer to an angle of axial bending relative to a fuselage and/or an angle of rotational twist around a reference axis.

As used herein, the term "weight" refers to a measure of mass (or downward force). As described in greater detail below weight can include a combination of structural weight and performance weight. As used herein, a "structural weight" refers to a measure of mass of a wing structure (and/or aircraft). As used herein, a "performance weight" (or battery weight) refers to an amount of energy required for operating an aircraft under various conditions and/or for a particular length of time. For example, a performance weight can refer to a weight of energy (e.g., a weight of fuel or a weight of battery) needed over a period of time to execute a flight mission of the aircraft.

As used herein, the term "equilibrium stress" refers to a measurement of internal force applied at a position (e.g., at an airfoil location) on the wing under equilibrium deformation and/or load conditions. For example, as mentioned above and as will be described in further detail below, the airfoil design system determines an equilibrium deformation metric corresponding to an equilibrium wing aerodynamic performance metric. Accordingly, as used herein the equilibrium stress refers to a measurement of internal forces at a position on the wing when the wing is deformed in accordance with the equilibrium deformation metric and/or equilibrium wing aerodynamic performance metric.

As used herein, the term "structural strength" refers to a measurement of capacity of an aircraft wing at a localized position along the span of the wing to bear a load. In particular, structural strength includes a measure of maximum incremental stress, force, or load (e.g., prior to failure). Accordingly, structural strength can include a failure index at a position along a wing. Structural strength can include a specific strength of the wing at an airfoil (e.g., a measure of incremental stress prior to failure per unit weight or mass).

As used herein, the term "pitching moment" of an airfoil refers to a torque produced by an aerodynamic force on the wing. In particular, pitching moment includes a torque applied to the wing (or airfoil) balanced by a horizontal stabilizer (e.g., horizontal tail area of an empennage). In addition, a "pitching moment coefficient" refers to a function of longitudinal static stability of an aircraft defined as a product of pitching moment, dynamic pressure, wing area, and a length of a chord of an airfoil.

As used herein, the term "turbulence level" refers to a parameter including an amplification factor associated with a level of simulated turbulence. In one or more embodiments described herein the airfoil design system simulates different levels of turbulence by changing an $N_{Crit}$ factor from a first value (e.g., $N_{Crit}$=9, referring to a common standard for non-turbulent flight conditions) to a second $N_{Crit}$ value (e.g., $N_{Crit}$=5, referring to higher turbulence flight conditions).

As used herein, the term "aircraft design" or "aircraft model" refer to a digital representation of an aircraft. In particular, the term aircraft model includes a digital representation of components of an aircraft such as a wing, a propulsion system, an empennage, or ailerons.

As used herein, the term "optimization algorithm" refers to a computer model that modifies quantitative design variables to accomplish an objective. In particular, an optimization algorithm includes a computer model that modified quantitative design variables of one or more airfoils to accomplish one or more objectives within one or more constraints. For example, in one or more embodiments, the airfoil design system utilizes an optimization algorithm that modifies quantitative design variables to determine a wing design that minimizes a structural weight (or cost). Moreover, in one or more embodiments, the airfoil design system utilizes an optimization algorithm that applies constraints such as a threshold pitching moment constraint, a turbulence robustness constraint, one or more stiffness constraints, and one or more strength constraints. In one or more embodiments, the constraints refer to one or more conditions that facilitate replacement of an original wing with a modified wing.

As discussed above, the airfoil design system can utilize a variety of different lightweight algorithms for modeling first order physics of an aircraft model and/or wing model. For example, the airfoil design system can utilize an airfoil performance algorithm and/or a structural analysis algorithm. As used herein, an "airfoil performance algorithm" refers to an algorithm for design or analysis of airfoils in an aircraft model. In particular, an airfoil performance algorithm includes an algorithm that determines lift characteristics, drag characteristics, and/or other characteristics of an airfoil (e.g., a two-dimensional cross-section of an airfoil). For example, an airfoil performance algorithm includes one or more versions of XFOIL: Subsonic Airfoil Development System (originally developed by Massachusetts Institute of Technology).

As used herein, a "structural analysis algorithm" refers to a computer model for determining structural properties of an aircraft model. In particular, a structural analysis algorithm includes a computer model for determining structural properties, deformations, stresses, and strains of an aircraft model (e.g., a wing of an aircraft model). For example, a structural analysis algorithm includes one or more versions of Co-Blade: Software for Analysis and Design of Composite Blades.

Additional disclosure will now be provided in connection with exemplary embodiments portrayed in the figures. For example, FIG. 1 illustrates an example environment 100 for implementing an airfoil design system 104. As shown in FIG. 1, the environment 100 includes server device(s) 102 in communication with client devices 106a-n via a network 108. The server device(s) 102, client devices 106a-n, and network 108 may be communicatively coupled with each other directly or indirectly (e.g., through the network 108). Moreover, server device(s) 102 and client devices 106a-n may comprise any type of computing device (including one or more computing devices as discussed in greater detail below in relation to FIG. 8).

As just mentioned, the environment 100 includes one or more server device(s) 102. The server device(s) 102 may generate, store, receive, and/or transmit any type of data, including aircraft models, wing models, airfoils, design inputs, variables, criteria, metrics, objectives, and constraints. As an example, the server device(s) 102 can receive data from a first client device 106a and send the data to a second client device 106b. In one or more embodiments, the server device(s) 102 incudes a data server. In addition or as an alternative, the server device(s) 102 can include a communication server or a web-hosting server.

Although FIG. 1 illustrates a particular number of devices, it will be appreciated that the environment 100 can include any number of computing devices (fewer or greater than shown). Similarly, although FIG. 1 illustrates a particular arrangement of the client devices 106a-n, the network 108, and the server device(s) 102, various additional arrangements are possible.

By way of example, in one or more embodiments, the first client device 106a sends a request to the server device(s) 102 to generate an aircraft wing model (e.g., a digital model of an aircraft wing). The client device 106a can provide to the server device(s) 102 one or more design inputs (e.g., based on user selection or a previous airfoil design). For instance, in one or more embodiments, the client device 106a provides an aircraft model that includes a base wing with a base airfoil. The server device(s) 102 can identify the base airfoil and an initial set of quantitative design variables from the aircraft model and the base wing. The airfoil design system 104 can then utilize resources of the server device(s) 102 to generate a new wing model.

For example, the airfoil design system 104 can analyze a set of input quantitative design variables and determine an aerodynamic performance metric for a cross-section of the wing corresponding to an airfoil as well as determine a cross-sectional structural stiffness based on digital quantitative variables of the airfoil. Moreover, the airfoil design system 104 can determine a wing aerodynamic performance metric and a deformation metric over the span of the wing to determine a variety of aero-structural performance outputs that model performance of the wing under various flight conditions. Furthermore, the airfoil design system 104 can utilize an optimization algorithm based on the aero-structural performance outputs to determine modifications to the quantitative design variables. For example, the airfoil design system 104 can modify the quantitative design variables based on the aero-structural performance outputs to accomplish one or more objectives (e.g., reduce weight) while satisfying one or more constraints (e.g., maintaining aerodynamic performance of the wing). The airfoil design system 104 can further cause the server device(s) 102 to provide the modified wing design (and/or modified quantitative design variables) to the client device 106a via the network 108.

As described in greater detail below (e.g., in relation to FIGS. 5-6), the airfoil design system 104 can also be implemented together with an aircraft design system (e.g., an aircraft design system implemented on the server(s) 102, the client device 106a, or a third-part server). Indeed, the server(s) 102 can utilize the aircraft design system to modify various subsystems of an overall aircraft design and provide the aircraft design to the aircraft design system 104. The aircraft design system 104 can then generate modified airfoils and a modified wing (e.g., a lighter weight wing) while satisfying operational constraints associated with the aircraft design (e.g., constraints generated based on the aircraft design to ensure that the airfoil can be safely utilized in the aircraft design). The aircraft design system 104 can then provide the modified airfoils and/or modified wing to the aircraft design system, which can modify various subsystems in light of the improved wing. Repeatedly utilizing the airfoil design system 104 and the aircraft design system results in an improved wing and an improved aircraft model.

As illustrated by the previous example embodiments, the airfoil design system 104 (and/or the aircraft design system) may be implemented in whole, or in part, by the individual elements of the environment 100. Although FIG. 1 illustrates the airfoil design system 104 implemented with regard to the server device(s) 102, in one or more embodiments, one or more components of the airfoil design system 104 (and/or the aircraft design system) can be implemented in any of the components of the environment 100. For example, in one or more embodiments, one or more features or functionalities of the airfoil design system 104 described herein may be implemented on one or more of the client devices 106a-n.

Figure 2:
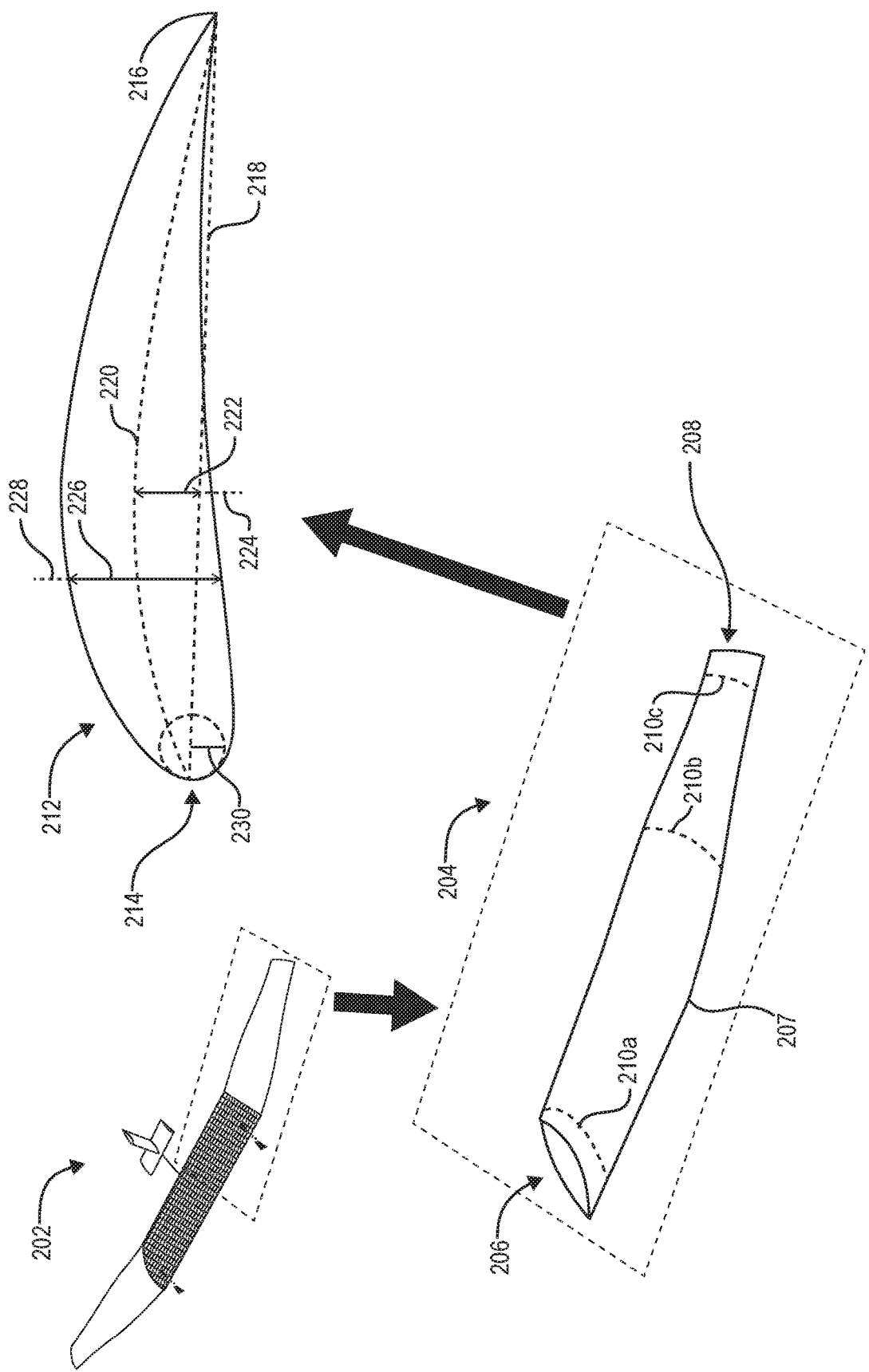
FIG. 2 illustrates an example workflow for identifying one or more airfoils from an input wing design in accordance with one or more embodiments.

As mentioned above, the airfoil design system 104 can identify an input set of quantitative design variables of an input airfoil corresponding to an aircraft wing. To provide an exemplary illustration of quantitative design variables, FIG. 2 illustrates identifying an input airfoil corresponding to an existing aircraft design. In particular, as shown in FIG. 2, the airfoil design system 104 receives an aircraft design 202 including a digital representation of an overall aircraft. In one or more embodiments, the airfoil design system 104 identifies a wing design 204 from the aircraft design 202. As shown in FIG. 2, the wing design 204 includes a root 206 corresponding to a portion of the wing closest to the fuselage of the aircraft design 202. In addition, the wing design 204 includes a tip 208 corresponding to an opposite end of the wing 204 from the root 206.

In one or more embodiments, the airfoil design system 104 identifies the input set of quantitative design variables by identifying airfoils of the wing design 204 corresponding to multiple stations (e.g., locations) along the span of the wing. For example, as shown in FIG. 2, the airfoil design system 104 can identify an airfoil at a first station 210a having a position at or near the root 206 of the wing design 204. In particular, the airfoil at the first station 210a reflects a cross-section of the wing design 204 from the root 206 to a break point 207 where the wing begins to taper. The airfoil design system 104 can further identify an airfoil at a second station 210b having a position at an intermediate point along the span of the wing design 204 between the break point 207 and the tip 208. The airfoil design system 104 can further identify an airfoil at a third station 210c having a position at or near the tip 208 of the wing design 204.

The airfoil design system 104 can identify any number of airfoils at any number of stations along the span of the wing design 204. In addition, in one or more embodiments, the airfoil design system 104 identifies stations 210a-c based on a user selection of a location along the span of the wing design 204. Alternatively, in one or more embodiments, the airfoil design system 104 implements an algorithm for selecting a number and/or position of stations along the span of the wing design 204 to identify airfoils representative of one or more properties of the changing shape of the wing design 204 between the root 206 and tip 208.

FIG. 2 further illustrates an example airfoil 212 (e.g., corresponding to a cross-section at the first station 210a) of the wing design 204. The example airfoil 212 of FIG. 2 illustrates a number of quantitative design variables. For instance, the airfoil 212 includes a leading edge 214 that first contacts air under flight conditions and a trailing edge 216 corresponding to a rear edge of the airfoil 212 and where airflow separated by the leading edge 214 rejoins under typical flight conditions. As further shown, the airfoil 212 includes a chord line 218 referring to an imaginary straight line joining the leading edge 214 and the trailing edge 216 of the airfoil 212. The airfoil 212 further includes a camber line 220 referring to a line that characterizes an asymmetry between the top and bottom surfaces of the airfoil 212, with the top surface being more convex than the bottom surface.

The airfoil design system 104 can identify a number of quantitative design variables from the airfoil 212. In particular, the airfoil design system 104 can identify a camber 222 (e.g., a maximum camber) referring to a distance between the chord line 218 and the camber line 216 (or other measurement of the curvature and/or asymmetry of the airfoil 212). The airfoil design system 104 can further identify a camber position 224 indicating a position of maximum camber along a chord of the airfoil 212 (e.g., a relative position from the leading edge 214).

In addition, the airfoil design system 104 can identify a thickness 226 (e.g., a maximum thickness) referring to a distance between a bottom surface and a top surface of the airfoil 212. In particular, the thickness 226 can refer to a maximum distance along the chord of the airfoil 212 between the top surface and bottom surface passing perpendicularly through the chord line 218 of the airfoil 212. In one or more embodiments, the airfoil design system 104 additionally identifies a max thickness position 228 indicating a position of maximum thickness along the chord of the airfoil 212 (e.g., a relative position from the leading edge 214).

Further, in one or more embodiments, the airfoil design system 104 identifies a leading edge radius 230 representative of a radius of curvature of the leading edge 214 of the airfoil 212. In particular, the airfoil design system 104 can identify the leading edge radius 230 by determining the radius of a circle centered on a line tangent to the leading edge 214 and connecting tangent points of the top and bottom surface of the airfoil 212.

While FIG. 2 illustrates one embodiment in which the airfoil design system 104 receives a wing design 204 and identifies quantitative design variables by identifying airfoils along the span of the wing design 204, in one or more embodiments, the airfoil design system 104 receives quantitative design variables without an overall aircraft design 202 and/or wing design 204. For example, in one or more embodiments, the airfoil design system 104 receives data associated with one or more airfoils including the above-described quantitative design variables and corresponding locations of the airfoils along the span of a wing.

For instance, in one or more embodiments, the airfoil design system 104 receives a set of quantitative variables including, for example, the leading edge radius, a camber (e.g., a maximum camber), a position of the camber along the chord line, a thickness (e.g., a maximum thickness), and a position of the maximum thickness along the chord line or camber line. In one or more embodiments, the airfoil design system 104 receives some or all of the quantitative design variables without receiving additional data included within a three-dimensional design for the wing 204, as shown in FIG. 2. Accordingly, in one or more embodiments, rather than receiving the wing design 204 and/or aircraft design 202, the airfoil design system 104 receives some or all of the quantitative design variables described herein including, for example, a maximum camber, a camber position, a maximum thickness, a maximum thickness position, and a leading edge radius.

As will be described in further detail below, in addition to receiving and/or identifying one or more quantitative design variables, the airfoil design system 104 can further identify one or more structural variables associated with the wing design 204. For example, in one or more embodiments, the airfoil design system 104 identifies structural variables including information about plies that make up a surface of the wing (e.g., a number of plies, a material of the plies, etc.), information about tapers or tapering of the wing between the root and tip, and information about webs or spars of the wing (e.g., web thickness). In addition, the airfoil design system 104 can identify material properties of any of the components that make up the structure of the wing.

Figure 3:
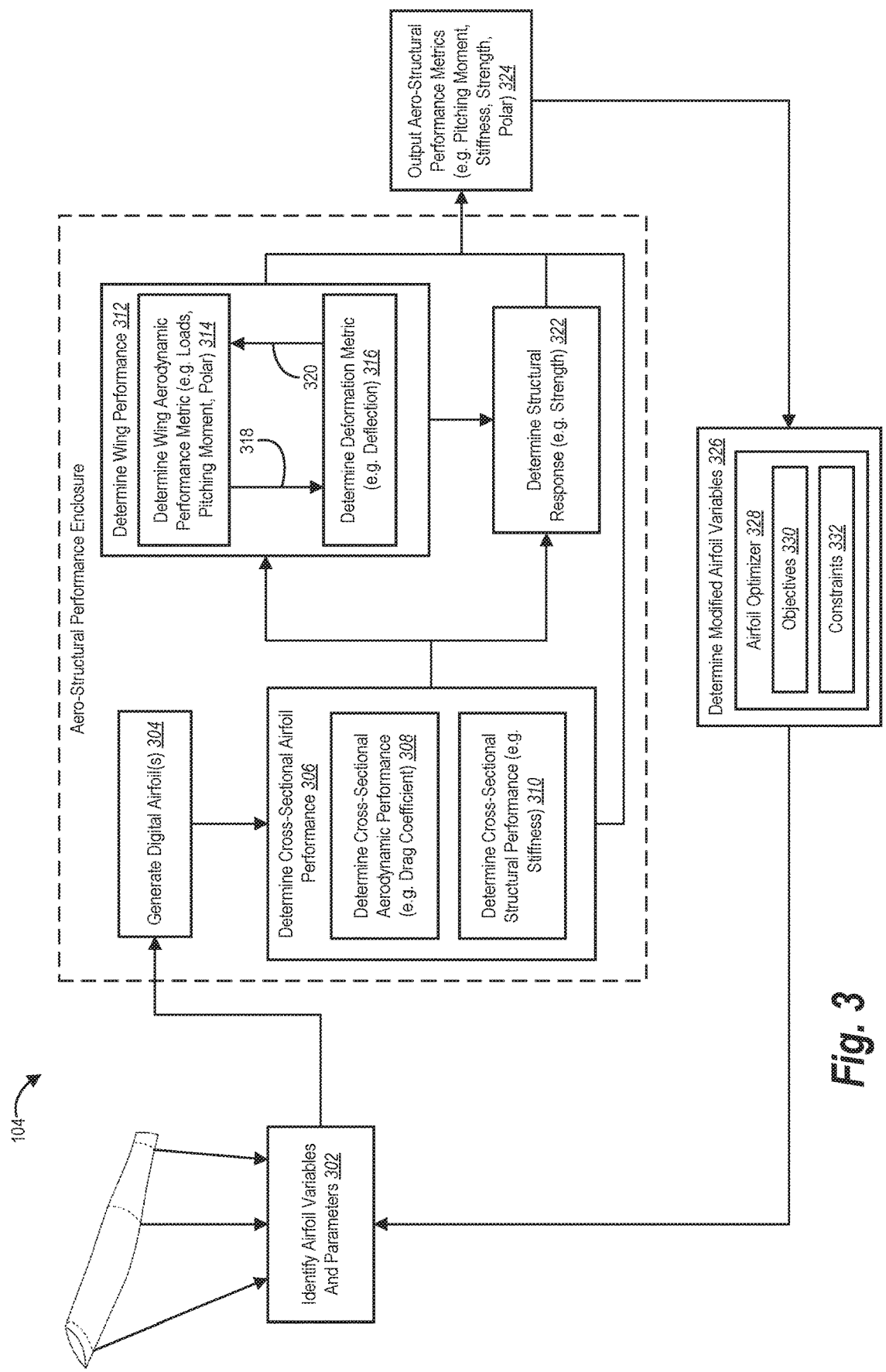
FIG. 3 illustrates a schematic diagram of generating a modified wing design in accordance with one or more embodiments.

As mentioned above, the airfoil design system 104 can analyze the input quantitative design variables to determine various aero-structural performance metrics associated with operation of a corresponding aircraft wing under various flight conditions. Moreover, the airfoil design system 104 can then generate a modified airfoil by altering the quantitative design variables. For example, FIG. 3 illustrates a schematic diagram for generating modified airfoils (and/or a modified wing) in accordance with one or more embodiments. In particular, FIG. 3 illustrates that the aircraft design system can perform an act 302 of identifying airfoil variables and parameters and then utilize the airfoil variables and parameters within an aero-structural performance enclosure to generate output performance metrics. In particular, the airfoil design system 104 can perform the act 304 of generating digital airfoil(s) and then perform the acts 306 and 312 of determining cross-sectional airfoil performance and wing performance. The airfoil design system 104 can then perform the act 324 of outputting aero-structural performance metrics and the act 326 of determining modified airfoil variables and parameters based on an airfoil optimizer 328. The airfoil design system 104 can repeat the acts 302-326 to explore the design space and generate an improved airfoil.

As just mentioned, FIG. 3 illustrates the airfoil design system 104 performing the act 302 of receiving and/or identifying airfoil variables and parameters. The airfoil design system 104 can perform the act 302 by identifying any of the quantitative design variables described above. For instance, the airfoil design system can identify quantitative design variables relating to a cross-sectional shape of the wing (e.g., a maximum camber, a maximum thickness, a leading edge radius, wing twists, and positions corresponding to a maximum camber and/or a maximum thickness) or digital quantitative variables relating to structure of the wing (e.g., materials, plies tapers, and web thickness of the airfoil).

In addition to quantitative design variables, the airfoil design system 104 can identify a variety of parameters that are used to generate an improved airfoil. For example, parameters can include a base airfoil (e.g., a starting airfoil), a base wing geometry, an existing aircraft design, stations for airfoils across the wing, and/or operating conditions (e.g., details of a flight mission, flight altitude, or cruising altitude).

In one or more embodiments, the airfoil design system 104 identifies airfoil variables by identifying airfoils from stations 210a-c along a span of the wing design 204, as shown in FIG. 2. In one or more embodiments, the airfoil design system 104 receives the airfoil variables and parameters from a remote device (e.g., the client device 106a).

Upon receiving or identifying the airfoil variables and parameters, the airfoil design system 104 can perform the act 304 of generating a digital airfoil (or multiple airfoils) based on the airfoil variables and parameters. In one or more embodiments, the airfoil design system 104 generates the digital airfoil by utilizing an airfoil performance algorithm (e.g., XFOIL) that extrapolates an airfoil shape from quantitative design variables. In particular, the airfoil performance algorithm can morph standardized settings to generate airfoils at indicated stations across the wing span that reflect the quantitative design variables.

Upon generating the digital airfoils, the airfoil design system 104 can also perform the act 306 of determining cross-sectional airfoil performance for each of the identified airfoils. For example, the airfoil design system 104 can perform a two-dimensional analysis on an identified airfoil to determine cross-sectional performance of the wing corresponding to the identified airfoil. The airfoil design system 104 can perform a similar analysis on each of the identified airfoils to determine cross-sectional performance metrics for each of the identified airfoils.

More specifically, as shown in FIG. 3, in one or more embodiments, the airfoil design system 104 performs an act 308 of determining a cross-sectional aerodynamic performance of the airfoil. In particular, the airfoil design system 104 determines a cross-sectional aerodynamic performance metric of the aircraft wing corresponding to an airfoil. In one or more embodiments, the airfoil design system 104 determines the cross-sectional aerodynamic performance metric by utilizing an airfoil performance algorithm (e.g.,)(FOIL). For example, the airfoil design system 104 can utilize the airfoil performance algorithm to determine a cruise lift coefficient, a profile drag coefficient, and/or a pitching moment coefficient (as discussed in greater detail below). The airfoil design system 104 can utilize the airfoil performance algorithm to determine different cross-sectional aerodynamic performance metrics at various Reynolds numbers and/or under different flight conditions. For example, the airfoil design system 104 can determine one or more cross-sectional aerodynamic metrics at different turbulence levels (e.g., at difference Nall levels).

In addition, as shown in FIG. 3 the airfoil design system 104 performs the act 310 of determining structural performance for the airfoil. In particular, the airfoil design system 104 performs the act 310 by determining a cross-sectional structural performance metric of the cross-section of the aircraft wing corresponding the airfoil. For example, in one or more embodiments, the airfoil design system 104 determines a structural stiffness of the wing at the station corresponding to the identified airfoil. Further, in one or more embodiments, the airfoil design system 104 determines the airfoil structural performance by utilizing a structural analysis algorithm (e.g., Co-Blade) to determine other cross-sectional structural performance metrics including, for example, stresses and strains at the identified airfoil (as discussed in greater detail below).

As further shown in FIG. 3, the airfoil design system 104 can utilize the determined cross-sectional aerodynamic performance to perform the act 312 of determining a wing performance for a three-dimensional wing design. In particular, based on the two-dimensional analysis performed on the identified on one or more airfoils, the airfoil design system 104 can perform an analysis (e.g., a three-dimensional analysis) over the span of the wing to determine one or more additional performance metrics of the overall wing. For example, as shown in FIG. 3, the airfoil design system 104 can perform the act 314 of determining one or more wing aerodynamic performance metrics over a span of the wing based on the cross-sectional aerodynamic performance metric(s) (from the act 308). The airfoil design system 104 can also perform the act 316 of determining one or more deformation metrics over the span of the wing based on the cross-sectional structural performance metrics (from the act 310), and the determined wing aerodynamic metric (from the act 314).

The airfoil design system 104 can perform the act 314 of determining wing aerodynamic performance metric(s) using a variety of methods. In one or more embodiments, the airfoil design system 104 performs the act 314 by utilizing a lifting-line method for predicting a lift distribution over the span of the wing at different stations along the span of the wing. In one or more embodiments, the airfoil design system 104 can utilize a lifting-line method (or modified lifting-line method described in greater detail below) to determine an aerodynamic load (e.g., a distributed load) applied to the surfaces of the wing under various flight conditions. In one or more embodiments, the airfoil design system 104 determines the aerodynamic load (or other wing aerodynamic performance metric) based on the cross-sectional aerodynamic performance metric(s) (from the act 308).

As shown in FIG. 3, the airfoil design system 104 can also perform the act 316 of determining one or more deformation metrics for the wing. In particular, the airfoil design system 104 can determine deflections and/or twists of the wing based on the cross-sectional structural performance metric (from the act 310) of the identified airfoils at different stations along the span of the wing. In one or more embodiments, the airfoil design system 104 additionally considers the wing aerodynamic performance metric (from the act 314) and/or the cross-sectional aerodynamic performance metrics (from the act 308) in determining a deformation metric. For example, the wing aerodynamic performance metric can indicate a distributed load across the wing. The airfoil design system 104 can utilize the distributed load together with cross-sectional structural performance metrics (e.g., stiffness) to determine a deformation metric (e.g., deflection) of the wing.

In one or more embodiments, the airfoil design system 104 determines multiple deformation metrics including a deflection of the wing perpendicular to the axial plane of the intersection between the wing and the fuselage of the aircraft. In addition, the airfoil design system 104 can determine a twist deflection of the wing.

The airfoil design system 104 can determine the deformation metric(s) using a variety of methods and algorithms. For example, in one or more embodiments, the airfoil design system 104 utilizes a Euler-Bernoulli Beam algorithm to determine load-carrying and deflection characteristics of the wing over the span of the aircraft wing. Moreover, in one or more embodiments, the airfoil design system 104 utilizes a structural analysis algorithm (e.g., Co-Blade) to determine the deformation metric(s) for the wing. In one or more embodiments, the structural analysis algorithm makes use of the Euler-Bernoulli Beam algorithm in combination with one or more additional algorithms to determine the deformation metric(s) for the wing.

As further shown in FIG. 3, the airfoil design system 104 can iteratively determine the aerodynamic metric(s) and deformation metric(s) to determine equilibrium metrics for the wing. Indeed, because deformation of the wing can impact wing aerodynamic performance and aerodynamic performance can impact deformation, the airfoil design system 104 can iteratively alternate between the acts 314 and 316. Indeed, as shown in FIG. 3, the airfoil design system 104 can perform the act 318 of obtaining a wing aerodynamic performance and then utilize the wing aerodynamic performance metric as part of the act 316. Moreover, as shown in FIG. 3, the airfoil design system 104 can perform the act 320 of obtaining a deformation metric and utilize the deformation metric as part of the act 314.

For example, as a result of the deformation caused by the aerodynamic load applied to the wing, the airfoil design system 104 determines a modified aerodynamic metric (e.g., using the lifting-line algorithm) in view of the deflections to the wing. In addition, as a result of the modified aerodynamic metric, the airfoil design system 104 determines a modified deformation metric (e.g., using the Euler-Bernoulli Beam algorithm) in view of the modified aerodynamic metric. The airfoil design system 104 can iteratively determine the aerodynamic metric and deformation metric across the span of the wing any number of times to determine updated metrics in view of changes that affect the corresponding metrics.

In one or more embodiments, the airfoil design system 104 determines modified aerodynamic and deformation metrics back-and-forth until a difference between subsequent calculations converges to a negligible change (e.g., zero or other threshold minimum) between iterations. Alternatively, in one or more embodiments, the airfoil design system 104 iteratively determines the aerodynamic and deformation metrics a threshold number of times to determine the equilibrium deformation metric corresponding to the equilibrium aerodynamic metric.

As further shown in FIG. 3, the airfoil design system 104 can perform the act 322 of determining a structural response. In particular, the airfoil design system 104 can determine a structural response of the wing based on the determined cross-sectional airfoil performance 306 and the determined wing performance 312. The structural response can indicate the loads that the wing will experience and the structural capability to handle those loads. For example, the airfoil design system 104 can determine a structural strength at a particular location along the wing (the root or the tip) based on the cross-sectional structural performance metric(s) (from the act 310) and the determined wing aerodynamic performance metric (from the act 314).

In particular, in one or more embodiments, the airfoil design system 104 determines a structural response by determining an incremental additional load (or force) that the wing can handle prior to failure (e.g., a failure index). Accordingly, the airfoil design system 104 can determine the structural response as an effective wing strength (e.g., incremental additional load before failure) based on a determined cross-sectional structural performance metric (e.g., failure stresses at the root and/or the tip of the wing) and further in view of the equilibrium aerodynamic metric over the span of the wing (e.g., a distributed aerodynamic load). Additional information with regard to determining the structural response of the wing will be provided below (e.g., in connection with FIG. 4C).

As shown in FIG. 3, the airfoil design system 104 can perform an act 324 of outputting (e.g., providing or generating) a number of aero-structural performance metrics. For example, the airfoil design system 104 can perform the act 324 by providing various aero-structural performance metrics from the aero-structural performance enclosure to the airfoil optimizer 328. Indeed, the airfoil design system 104 can provide cross-sectional aerodynamic performance measures, cross-sectional structural performance metrics, wing aerodynamic performance metrics, deformation metrics, or a structural response.

For instance, as part of the act 324, the airfoil design system 104 can provide strength of the wing (e.g., a specific strength at the root or tip), stiffness of the wing (e.g., a specific stiffness at the root or tip), or a polar (or lift to drag ratio/profile drag). Moreover, the airfoil design system 104 can provide an equilibrium deformation metric (e.g., a deformed shape of the wing), a distributed load across the deflected wing, or a digital representation (e.g., a 3D model) of the wing based on the identified airfoils.

In one or more embodiments, the airfoil design system 104 utilizes one or more of the output performance metrics to determine a modified design for the wing. In particular, the airfoil design system 104 can perform the act 326 of determining modified airfoil variables by providing one or more of the output performance metrics to an airfoil optimizer 328. In particular, the airfoil optimizer 328 can explore the design space to achieve objectives 330 subject to constraints 332. For example, in relation to FIG. 3, the airfoil the objective 330 includes minimizing weight (and/or cost). Moreover, the constraints 332 include a pitching moment threshold, a stiffness threshold, strength threshold, and profile drag threshold.

The multi-disciplinary aircraft design system can ensure that quantitative variables satisfy the constraints 330 by comparing the constraints 332 to the aero-structural performance metrics determined in the aero-structural performance enclosure. For example, the multi-disciplinary aircraft design system can compare the constraints 332 to pitching moment, stiffness, strength, and/or polar (e.g., profile drag) of the aero-structural output performance metrics (from the act 324). If the aerostructural performance metrics fail to satisfy the constraints 330, the airfoil design system 104 can utilize the airfoil optimizer 328 to modify quantitative design variables that will satisfy the constraints 332. The airfoil design system 104 can thus iteratively explore the design space to achieve the objectives 330 within the constraints 332.

The airfoil design system 104 can utilize a variety of different optimization algorithms. For example, in one or more embodiments, the airfoil design system utilizes an optimization algorithm that comprises a process-integration and optimization environment for design space exploration and optimization. Specifically, the airfoil design system can utilize one or more versions of modeFrontier (developed by ESTECO). Additional information with regard to utilizing the airfoil optimizer 328 will be provided below in connection with FIG. 4D.

As shown in FIG. 3, the airfoil design system 104 can further modify the airfoil variables (from the act 302) to generate a modified design for the wing and associated airfoils. Moreover, the airfoil design system 104 can repeat the acts 302-326. In particular, the airfoil design system 104 can identify input airfoil variables (from the previous iteration), provide the modified airfoil variables to the aero-structural performance enclosure, generate aero-structural output performance metrics, and determine modified airfoil variables. In this manner, the airfoil design system 104 can iteratively identify modified airfoils, learn the design space, and generate improved (final) airfoils (and corresponding final wing design).

The acts 302-326 described in relation to FIG. 3 are intended to be illustrative of an exemplary sequence of acts in accordance with the present disclosure, and are not intended to limit potential embodiments. Alternative embodiments can include additional, fewer, or different acts than those articulated in FIG. 3. For instance, in one or more embodiments, the airfoil design system 104 does not include the act 322 (of determining structural response).

Additionally, the acts described herein may be performed in a different order, may be repeated or performed in parallel with one another, or may be performed in parallel with different instances of the same or similar acts. For example, in one or more embodiments, the airfoil design system 104 performs the act 324 as part of other acts (and does not include a separate act for outputting aero-structural performance metrics).

As mentioned above, the airfoil design system can utilize a variety of lightweight algorithms to determine and modify the aero-structural performance of the airfoils and wing. For example, in one or more embodiments, the airfoil design system utilizes an airfoil performance algorithm (e.g., XFOIL) to determine sectional aerodynamics across all Reynolds numbers. Similarly, the airfoil design system utilizes a structural analysis algorithm (e.g., Co-Blade) to determine cross-sectional structural properties. The airfoil design system can further utilize a lifting-line method to determine distributed loads (lift and drag) across the wing.

In one or more embodiments, the aircraft flight modeling algorithm integrates sectional aerodynamics using unsteady lifting-line theory and integrates distributed structural properties using geometrically nonlinear beam theory. Moreover, in some embodiments, the airfoil design system returns distributed loads from the aircraft flight modeling system to the structural analysis algorithm to compute stresses and deflections. The airfoil design system further utilizes a modified lifting line model to determine lift, drag, and other parameters (e.g., flight polars).

To illustrate, the airfoil design system can utilize the airfoil performance algorithm and structural analysis algorithm to model aerodynamic performance of an aircraft model. For example, the airfoil design system can characterize a set of airfoils appropriate for a target Reynolds number with the airfoil performance algorithm. The airfoil design system can then determine cross-structural aerodynamic performance metrics in the form of thickness-indexed multi-dimensional tables (e.g., five-dimensional tables) representing sectional $C_l$ (cruise lift coefficient), $C_d$ (drag coefficient), and $C_m$ (pitching moment coefficient, also constructed for various angles of attack, designated $C_{m\alpha}$), Reynolds number, control surface relative chord, and deflection. At each Reynolds number, the airfoil design system constructs an equivalent low order polar alongside with control derivatives. The airfoil design system subsequently utilizes these parameters in the aero-structural performance enclosure (e.g., to determine wing aerodynamic performance, deformation metrics, and structural response).

Moreover, as mentioned the airfoil design system can also utilize lightweight algorithms with regard to structural analysis. For example, in one or more embodiments, the airfoil design system utilizes a structural concept that comprises a box-spar with sandwich panels (although the airfoil design system can utilize other structural concepts) that consist of unidirectional, plain-weave and core plies to provide bending and torsional stiffness. As mentioned above, the airfoil design system (e.g., utilizing the airfoil optimizer 328) can modify the number of plies and the geometry of the sparbox as a design variable. The airfoil design system can utilize a structural analysis algorithm that employs classical laminate theory to determine failure stress criteria for a given loading. Moreover, the airfoil design system can utilize a structural analysis algorithm that employs Euler-Bernoulli beam theory to compute wing displacements and twists.

Proceeding onto FIGS. 4A-4D, additional detail is provided in connection with one or more acts discussed above in relation to FIG. 3. In particular, FIGS. 4A-4D provide additional detail regarding utilizing lightweight analytical approaches just discussed to perform the acts 302-326 introduced in FIG. 3.

Figure 4A:
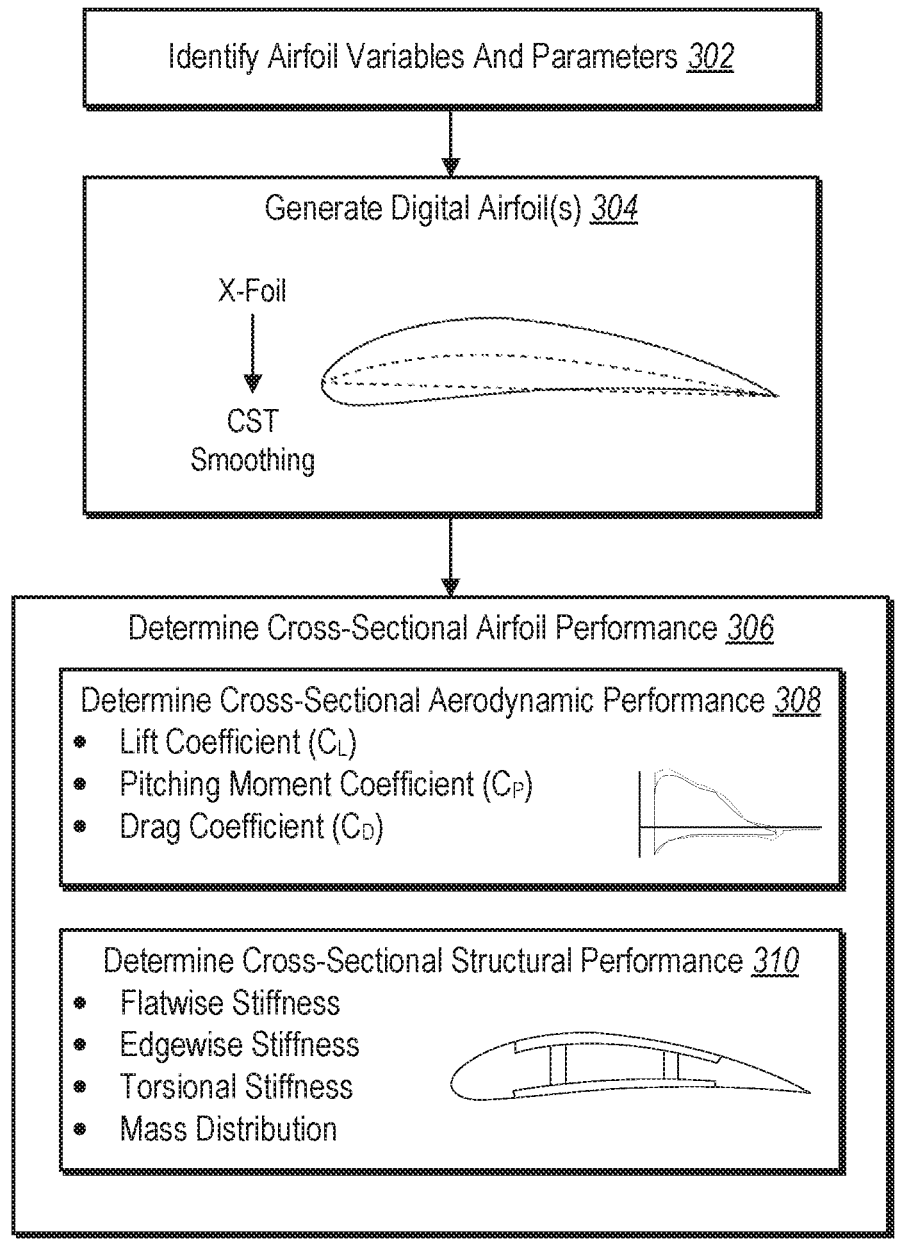
FIG. 4A-4D illustrate more detailed schematic diagrams of the airfoil optimization process for generating a modified wing design in accordance with one or more embodiments.

For example, FIG. 4A illustrates additional detail in connection with generating the digital airfoil and determining cross-sectional performance of the airfoil discussed above in connection with FIG. 3. In particular, FIG. 4A illustrates the airfoil design system 104 generating one or more digital airfoils at different positions along the span of the wing (the act 304) and determining cross-sectional airfoil performance (the act 306).

As mentioned above, and as shown in FIG. 4A, the airfoil design system 104 can generate the digital airfoil by utilizing an airfoil performance algorithm (e.g., XFOIL) that extrapolates the airfoil shape from the airfoil variables and parameters. In one or more embodiments, the airfoil design system 104 generates the original airfoil with a 16 Hicks-Henne Bumps methodology. In addition, using XFOIL, the airfoil design system 104 can morph one or more airfoils across the span of the wing. In particular, in one or more embodiments, the airfoil design system 104 can utilize XFOIL to morph airfoil features (to reflect the digital design variables), including: maximum camber, maximum thickness, leading edge radius, position along the chord corresponding to maximum camber, and position along the chord corresponding to maximum thickness.

As further shown in FIG. 4A, in one or more embodiments, the airfoil design system 104 further refines and smooths the airfoil shape by utilizing a class/shape transformation (CST) parameterization method. In particular, the airfoil design system 104 can utilize a CST parameterization method that defines a basic shape in accordance with a class function and modifies the designed shape in accordance with a shape function. In one or more embodiments, the airfoil design system 104 utilizes the CST parameterization method described in "Inverse Airfoil Design Utilizing CST Parameterization" by Lane and Marshall, which is incorporated by reference herein.

As mentioned above, and further shown in FIG. 4A, the airfoil design system 104 performs the act 306 of determining cross-sectional airfoil performance, in part, by determining a cross-sectional aerodynamic performance (e.g., the act 308). In one or more embodiments, the airfoil design system 104 utilizes the airfoil performance algorithm to determine the cross-sectional aerodynamic performance by determining a lift coefficient ($C_L$), a pitching moment coefficient ($C_P$), and a drag coefficient ($C_D$). Moreover, the airfoil design system 104 can determine these values at different Reynold's numbers and different angles of attack. Furthermore, the airfoil design system 104 can further determine a lift to drag ratio for the identified airfoil(s).

As further shown in FIG. 4A, the airfoil design system 104 also performs the act 306 of determining cross-sectional airfoil performance by determining a cross-sectional structural performance (e.g., the act 310). In one or more embodiments, the airfoil design system 104 determines cross-sectional structural performance by utilizing a structural performance algorithm to determine a flatwise stiffness (e.g., out-of-plane bending stiffness), edge-wise stiffness (e.g., in-plane bending stiffness), and torsional stiffness (e.g., resistance and twisting stiffness). The airfoil design system 104 can further determine mass distribution of the airfoil distributed across a portion of the wing (e.g., across a box representative of the airfoil distributed over a portion of the wing) as well as an overall mass of the portion of the wing.

In determining the airfoil structural performance, the airfoil design system 104 considers airfoil parameters in addition to the digital design variables associated with a shape of the airfoil. In particular, the airfoil design system 104 may consider material properties (e.g., a material used for the plies that make up the wing) to determine the different stiffness metrics.

In one or more embodiments, the airfoil design system 104 performs the act 310 by generating a database of structural parameters reflecting different loads, stresses, and/or deformations. For example, the airfoil design system 104 can analyze wing materials, a laminate schedule, airfoil shape, plies, and sectional twist to generate a database that reflects failure stresses/loads for cross-sections corresponding to the airfoils.

Figure 4B:
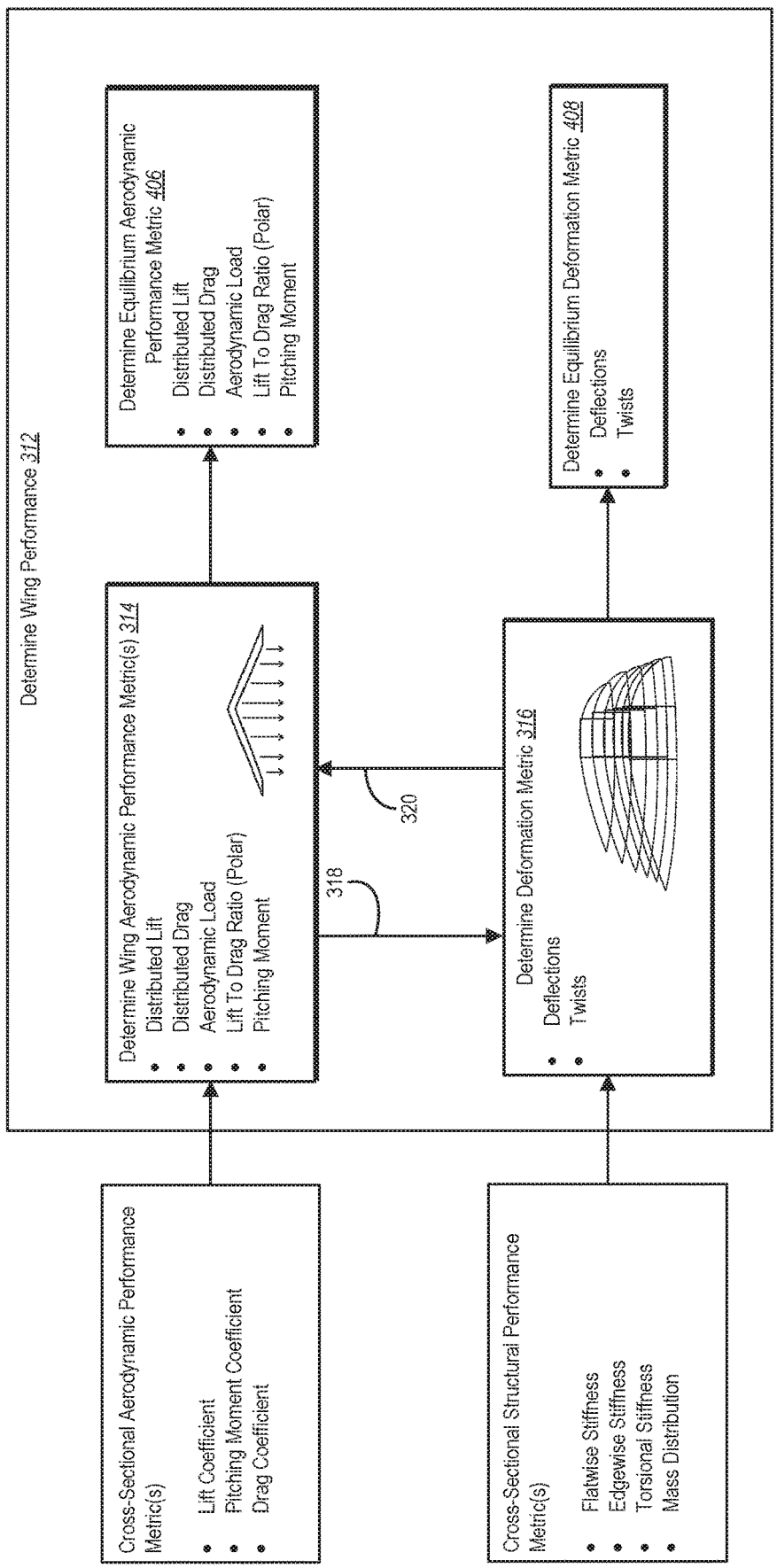

Turning now to FIG. 4B, additional detail will be provided regarding the act 312 of determining wing performance. As shown in FIG. 4B, the airfoil design system 104 determines wing performance based on cross-sectional aerodynamic performance metrics. In particular, the airfoil design system 104 can utilize a lift coefficient, pitching moment coefficient, or profile drag coefficient to determine wing aerodynamic performance metrics. For example, the airfoil design system 104 can determine a distributed lift, a distributed drag, and/or an aerodynamic load representative of forces applied to a surface of the wing under one or more flight conditions. The airfoil design system 104 can further determine one or more flight polars.

As mentioned above, and as shown in FIG. 4B, the airfoil design system 104 can determine the aerodynamic metric by utilizing a lifting line method. For example, the airfoil design system 104 can utilize a classic lifting line method that discretizes the span of the wing with horseshoe vortices that provide simplified representations of the wing. In one or more embodiments, the airfoil design system 104 computes the strength or circulation (F) of each horseshoe vortex utilizing the two-dimensional Kutta Houkowski theorem $$L = \tfrac{1}{2} \rho V^2 c c_L = \rho V \Gamma,$$

and further utilizing a local flow field and linear lift coefficient assumption vs. AoA where $$C_L = C_{L\alpha} \alpha + C_{L_0}.$$

The airfoil design system 104 can further utilize the Biot and Savart rule rating circulation back to the induced flow field to determine a closure relationship.

In one or more embodiments, the airfoil design system 104 utilizes a modified lifting line method. In particular, to overcome limitations as a result of non-linearities of the lift coefficient (CL) v. AoA (angle of attack) as the aircraft approaches stall and where high altitude long endurance (HALE) aircrafts tend to operate, the airfoil design system 104 re-introduces non-linearity from a polar by looking up $C_{L\alpha}$, and $C_{L_0}$ at each angle. The airfoil design system 104 enforces closure through Newton iterations and further efficiently calculates the aerodynamic performance metrics fast and reliably by utilizing an analytical Jacobian matrix, which further allows for stall capturing. For example, the airfoil design system 104 can utilize the following analytical Jacobian matrix to ensure enclosure when determining the aerodynamic performance metrics.

$$\begin{pmatrix} c_{l,1}^{polar} - c_{l,1}^{KJ} \\ c_{l,2}^{polar} - c_{l,2}^{KJ} \\ \ldots \\ c_{l,N}^{polar} - c_{l,N}^{KJ} \end{pmatrix} = f \begin{pmatrix} \Gamma_1 \\ \Gamma_2 \\ \ldots \\ \Gamma_N \end{pmatrix}$$

As shown in FIG. 4B, the airfoil design system 104 can also perform the act 312 by performing the act 316 of determining a deformation metric. As shown in FIG. 4B, the airfoil design system 104 can determine a deformation metric utilizing cross-sectional structural performance metrics, such as flatwise stiffness, edgewise stiffness, torsional stiffness, and mass distribution.

Moreover, the airfoil design system 104 can perform the act 316 based on a wing aerodynamic performance metric determined at the act 314. For example, the airfoil design system 104 can utilize an aerodynamic load (determined using the lift-line method described at the act 314) and a structural performance algorithm (e.g., Co-Blade) that utilizes the Euler-Bernoulli Beam algorithm to determine deflections and twists of the wing as a result of forces applied to the wing under flight conditions. Thus, in one or more embodiments, the airfoil design system 104 utilizes the Euler-Bernoulli Beam algorithm to determine deflections and twists of the wing based on an aerodynamic load applied across the span of the wing.

As described above, the airfoil design system 104 can iteratively determine the aerodynamic metric and deformation metric in view of the effect that the different metrics have on each other. In particular, as a result of deflections to the wing, the airfoil design system 104 can determine an updated aerodynamic metric (e.g., using the lifting-line method) resulting in a change to the determined deflections and twists based on the aerodynamic load. Accordingly, as shown in FIG. 4B, the airfoil design system 104 can iteratively determine the aerodynamic metric and deformation metric any number of times until converging to determine one or more equilibrium metrics for the wing.

In particular, as shown in FIG. 4B, the airfoil design system 104 performs the act 406 of determining an equilibrium aerodynamic performance metric and further performs the act 408 of determining an equilibrium deformation metric corresponding to the equilibrium aerodynamic performance metric. In one or more embodiments, the airfoil design system 104 determines the equilibrium metrics by iteratively determining the aerodynamic metric and deformation metric a predetermined number of times. Alternatively, in one or more embodiments, the airfoil design system 104 iteratively determines the aerodynamic metric and the deformation metric any number of times until a difference between subsequent iterations of the aerodynamic metric and/or deformation metric differ by less than a threshold amount. For example, the airfoil design system 104 can iteratively determine the aerodynamic metric and deformation metric until subsequent iterations of one or both of the aerodynamic metric and the deformation metric differ by less than 1% (or another threshold amount).

As shown in FIG. 4B, the equilibrium aerodynamic performance metric can include equilibrium values for distributed lift, distributed drag, aerodynamic load, lift to drag ratio (polars), and/or pitching moment. Moreover, the equilibrium deformation metric can include equilibrium deflections or twists.

Figure 4C:
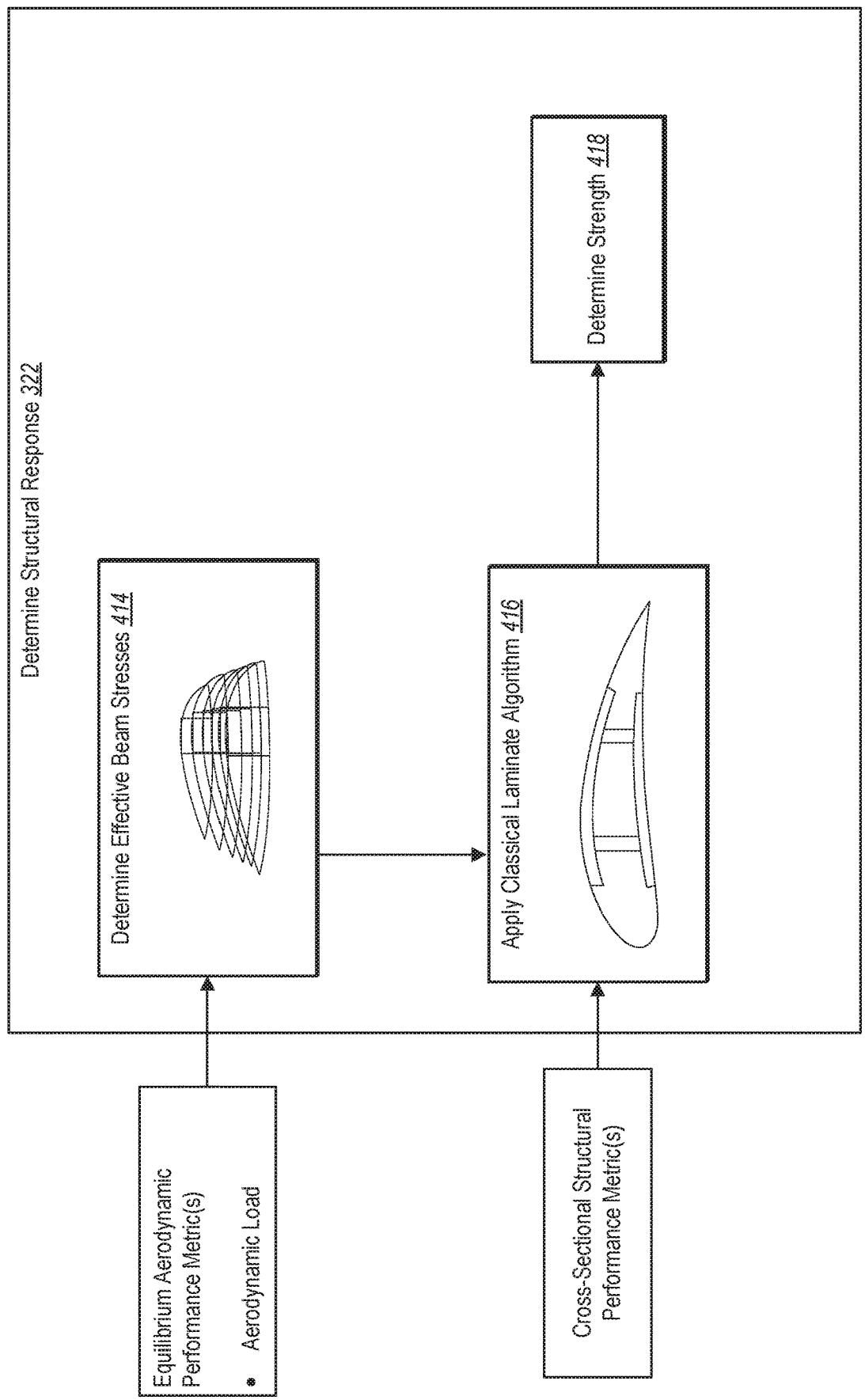

As mentioned above, the airfoil design system 104 can also perform the act 322 of determining a structural response of the wing. In particular, as shown in FIG. 4C, the airfoil design system 104 can perform the act 322 by performing the act 414 of determining effective beam stresses based on a determined equilibrium aerodynamic metric, such as aerodynamic load. In particular, as shown in FIG. 4C, the airfoil design system 104 determines the effective beam stresses by utilizing a structural performance algorithm (e.g., Co-Blade) that makes use of the Euler-Bernoulli Beam algorithm to determine effective beam stresses across the span of the wing.

In one or more embodiments, the airfoil design system 104 determines effective beam stresses by determining one or more equilibrium beam stresses at specific locations across the span of the wing. For example, the airfoil design system 104 can determine an equilibrium stress for an airfoil at the root of the wing corresponding to a measurement of internal force applied at the wing under equilibrium deformation and load conditions. The airfoil design system 104 can similarly determine an equilibrium stress at the tip of the wing (or at one or more intermediate locations between the root and tip).

As further shown, the airfoil design system 104 also applies a classical laminate algorithm 416 to determine localized stresses. In particular, the airfoil design system 104 can apply a structural analysis algorithm (e.g., Co-Blade) that utilizes the classical laminate algorithm to resolve stresses in localized areas (e.g., stations of the wing corresponding to airfoils). In particular, the airfoil design system 104 can utilize the structural analysis algorithm to convert a distributed load to localized stresses (e.g., equilibrium stresses) at particular locations along the wing. Thus, the airfoil design system 104 can determine lamina level stresses at stations of the wing corresponding to one or more airfoils.

As shown, the airfoil design system 104 can also perform the act 418 of determining strength. In particular, once the localized stresses (e.g., equilibrium stresses) are known, the airfoil design system 104 can determine remaining effective strength at localized stations based on the equilibrium stress(es) at airfoils along the span of the wing. For example, based on the cross-sectional structural performance metrics (determined at the act 310) and cross-sectional structural performance metrics, the airfoil design system 104 can determine incremental additional stress/load prior to failure at the root or tip. For example, in one or more embodiments, the airfoil design system 104 considers a structural database (e.g., generated at the act 310) together with the lamina level stresses to determine effective strength.

Accordingly, the airfoil design system 104 can determine failure indices at various locations along the wing. Thus, the airfoil design system 104 can utilize a classical laminate analysis to analyze stresses and strains using a system of linear equations to determine lamina-level stresses and failure indices at localized areas of the wing.

Figure 4D:
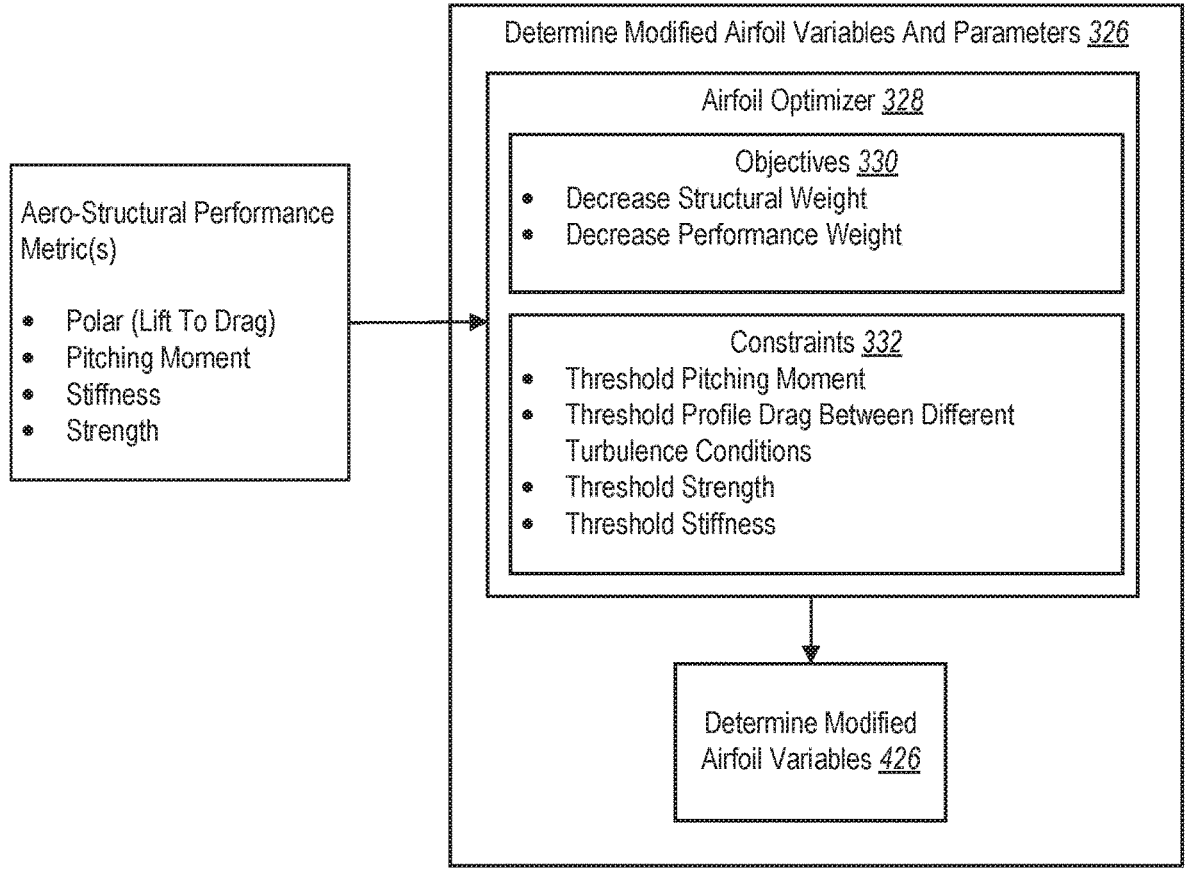

As mentioned above, the airfoil design system 104 can provide one or more of the determined performance metrics to an airfoil optimizer 328 to perform the act 326 of determining modified airfoil variables. To illustrate, FIG. 4D shows an example embodiment in which the airfoil design system 104 provides various aero-structural performance metrics to the airfoil optimizer 328. Specifically, as illustrated in FIG. 4D, the airfoil design system 104 provides a polar (or lift to drag ratio or profile drag), a pitching moment, one or more stiffness measurements, and one or more strength measurements to the airfoil optimizer 328. The airfoil design system 104 can provide any of the performance metrics described herein.

As mentioned above, and as shown in FIG. 4D, the airfoil optimizer 328 utilizes an optimization algorithm to determine modified airfoil variables to accomplish on or more objectives 330. For instance, as shown in FIG. 4D, the objectives 330 includes decreasing a structural weight (of the wing) and decreasing a performance weight. In one or more embodiments, the airfoil design system 104 utilizes the airfoil optimizer 328 to determine modified airfoil variables and parameters that maximize a weight loss including a sum of the structural weight and the performance weight for the aircraft.

Accordingly, in one or more embodiments, the airfoil design system 104 determines modified airfoil variables and parameters that minimize a function including a structural weight and performance weight of the aircraft. With regard to structural weight, the airfoil design system 104 can utilize airfoil and wing design to determine a weight. In one or more embodiments, the airfoil design system 104 utilizes a structural analysis algorithm (e.g., Co-Blade) to determine structural weight for a wing design.

As mentioned above, in one or more embodiments, the airfoil design system 104 determines a performance weight based. In particular, the airfoil design system 104 can determine a performance weight that reflects energy (e.g., fuel or battery weight) needed to perform a flight mission. The airfoil design system 104 can utilize a variety of flight missions to determine a performance weight. For instance, in one or more embodiments, the airfoil design system 104 determines a weight of energy required to fly at a specific altitude for a specific time.

In one or more embodiments, the airfoil design system 104 determines performance weight based on a cruising flight mission (e.g., cruising through the night on the winter solstice when the least amount of solar energy is available). For instance, the airfoil design system 104 can determine performance weight by modeling a cruising flight mission that begins at a first altitude, cruises (decreases altitude), and then maintains a second altitude. In particular, the airfoil design system 104 can model an aircraft that climbs to a higher altitude during the day to facilitate a gliding flight mission at night (e.g., to save power). In such circumstances, the airfoil design system 104 can model energy required to cruise from the first altitude to the second altitude and maintain the second altitude (e.g., until sunrise begins to replenish solar batteries).

To illustrate, in one or more embodiments, the airfoil design system 104 utilizes the following equation to determine weight (or change in weight from the base design):

$$\Delta W = \Delta W_{batt} + \Delta W_{structure};$$

$$\Delta W = \Delta W_{structure} + \frac{-\frac{g}{E_{specific}}}{\left(1 - \frac{g}{E_{specific}} \frac{T_{min,alt} V_{TAS,cruise}}{\frac{L}{D}\big|_{cruise}}\right)} \cdot$$

$$\left[ \frac{V_{TAS,cruise} W \Delta h}{V_{TAS,alt} \frac{L}{D}\big|_{cruise}} \Delta \frac{L}{D}\big|_{alt} + \frac{T_{min,alt} V_{TAS,cruise} W}{\frac{L}{D}\big|^2_{cruise}} \Delta \frac{L}{D}\big|_{cruise} \right]$$

where $\Delta W_{structure}$ refers to a change in structural weight between an input wing design and a modified wing design in view of modified airfoil variables and parameters and the $\Delta W_{batt}$ refers to a change in a performance weight between the different wing designs. In addition, $E_{specific}$ refers to a specific energy density of the batteries, g refers to gravity, L/D refers to a lift to drag ratio determined in view of the equilibrium aerodynamic performance metric at a corresponding altitude, $V_{TAS,cruise}$ refers to a true-speed of the aircraft at cruise altitude, $V_{TAS,alt}$ refers to a true-speed of the aircraft at a minimum altitude, $T_{min,alt}$ refers to a time spent at minimum altitude, and $\Delta h$ refers to a difference in altitude between the minimum altitude and a typical projected altitude of the aircraft (e.g., cruise altitude, average altitude, or other predetermined altitude).

Although the foregoing example implementation illustrates determining (and minimizing) a change in weight (e.g., from a base design), in one or more embodiments, the airfoil design system 104 does not calculate the change in weight. Rather, the airfoil design system 104 can calculate weight of each design and apply an optimization algorithm with the objective to minimize the weight.

As further shown in FIG. 4D, the airfoil design system 104 utilizes one or more constraints in conjunction with the airfoil optimizer 328. For example, the airfoil design system 104 can utilize a constraint including a threshold pitching moment. In one or more embodiments, the threshold pitching moment is based on a base wing design. For example, the threshold pitching moment constraint can comprise an inequality (e.g., less than or equal to) relative to the pitching moment for the base airfoil(s). Accordingly, the airfoil design system 104 can determine a pitching moment for the base wing. The airfoil design system 104 can compare the calculated pitching moment and the threshold pitching moment to determine whether the airfoil design satisfies the constraints. The airfoil design system 104 can further constrain the optimization algorithm to determine modified airfoil variables having associated pitching moments that satisfy the threshold pitching moment.

As another example, the airfoil design system 104 can utilize a constraint that includes a threshold profile drag between different turbulence conditions for the modified wing design. In particular, the airfoil design system 104 can provide a constraint that requires less than a threshold increase in profile drag (or lift to drag ratio) for the modified wing design when an NCrit level is changed from a lower turbulence level to a higher turbulence level. As an example, the airfoil design system 104 can apply a constraint that the profile drag increase by no more than 10% when an NCrit level is changed from NCrit=9 (e.g., lower turbulence level) to NCrit=5 (e.g., higher turbulence level). The airfoil design system can determine profile drag for an airfoil design at different turbulence levels (e.g., utilizing the steps 302-316) and compare the change in profile drag to the threshold.

As another example, the airfoil design system 104 can utilize a constraint including a threshold strength and/or threshold stiffness for one or more airfoils. In one or more embodiments, the threshold strength and/or threshold stiffness is based on a base airfoil or base wing design. For instance, the airfoil design system 104 can utilize as a constraint that a specific bending strength for the modified airfoils at the root and/or tip of the wing be equal to or exceed the specific bending strength for a base airfoil (or base wing). In addition, the airfoil design system 104 can utilize a constraint that a specific bending stiffness for the modified airfoils at the root and/or tip of the wing be equal to or exceed the specific bending stiffness for a base airfoil (or wing). Furthermore, the airfoil design system 104 can provide as a constraint that a specific torsional stiffness for the modified airfoils at the root and/or tip of the wing be equal to or exceed the specific torsional stiffness for the corresponding base airfoil (or wing). In one or more embodiments, the airfoil design system 104 applies the threshold strength and/or threshold stiffness constraints to each of the airfoils along the span of the wing.

The airfoil design system 104 can select modified airfoil variables to pursue the objective(s) 330 subject to the constraints 332. In particular, the airfoil design system 104 can iteratively learn the design space by identifying variables for airfoils that do (or do not) satisfy the constraints and do (or do not) improve the objective. Accordingly, the airfoil design system 104 can iterate to an improved aircraft design that reduces weight while maintaining (or improving) aerodynamic performance.

Figure 5:
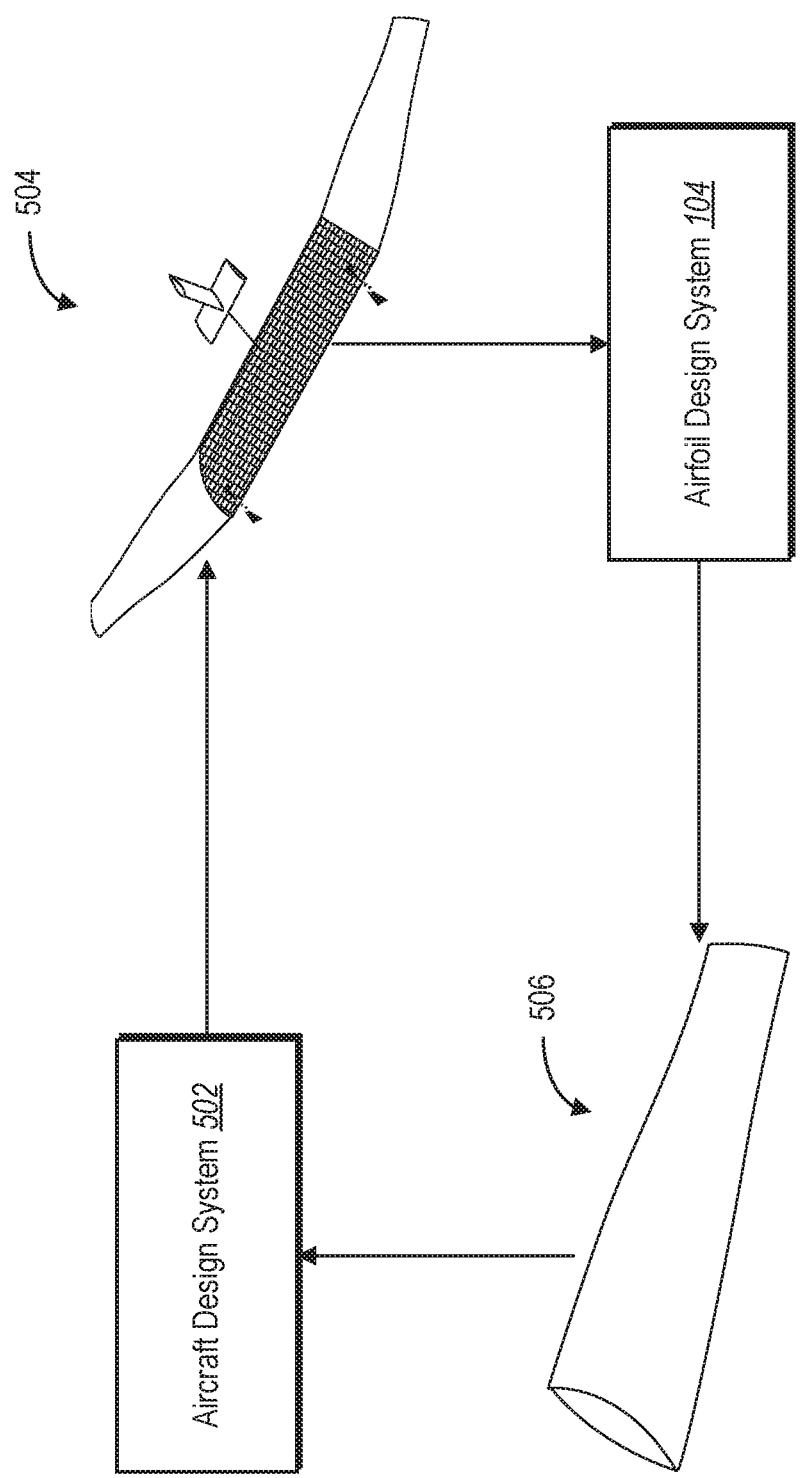
FIG. 5 illustrates an example workflow for iteratively modifying an aircraft wing design and an aircraft design in accordance with one or more embodiments.

As mentioned above, the airfoil design system 104 can also operate in conjunction with an aircraft design. For example, FIG. 5 illustrates the airfoil design system 104 operating in conjunction with an aircraft design system 502 to generate a modified aircraft design and/or modified wing design in accordance with one or more embodiments. For example, as shown in FIG. 5, an aircraft design system 502 generates an aircraft design 504. The airfoil design system 104 can receive as input the aircraft design 504 and identify, from the aircraft design 504, digital design variables and parameters of the wing. For example, the airfoil design system 104 can identify airfoils from the wing(s) of the aircraft design 504 to utilize in determining modified airfoil parameters to improve the aerodynamic and structural performance of the aircraft.

In particular, the airfoil design system 104 utilizes the digital design variables and parameters of the wing to determine aero-structural performance metrics and determine modified airfoil variables resulting in a modified wing design 506. In particular, the airfoil design system 104 utilizes an optimization algorithm to determine airfoil variables that improve an objective of decreasing a weight of the aircraft while satisfying one or more constraints and generates a modified wing design 506 based on the modified airfoil variables. Alternatively, in one or more embodiments, rather than generating a modified wing design 506, the airfoil design system 104 simply provides the modified airfoil variables and parameters to the aircraft design system 502.

As shown in FIG. 5, the aircraft design system 502 receives as input the modified wing design 506 (or, alternatively, the modified airfoil variables and parameters). In one or more embodiments, the aircraft design system 502 implements the modified wing design 506 by replacing the wings from the aircraft design 504 with the modified wing design 506. In one or more embodiments, because the airfoil design system 104 generated the airfoil variables and parameters subject to the one or more constraints of the optimization algorithm, the aircraft design system 502 can implement the wing design 506 without further modification to the overall aircraft design (and still satisfy flight constraints of the overall aircraft design). Nonetheless, in one or more embodiments, the aircraft design system 502 optimizes one or more design variables and parameters of one or more subsystems of the aircraft in view of the modified wing design and further optimizes a design of the aircraft.

In one or more embodiments, the aircraft design system 502 and airfoil design system 104 iteratively modify the aircraft design and wing design until arriving at a final design for the aircraft. For example, the aircraft design system 502 can further modify an aircraft design (including modifying airfoil variables and parameters) and provide updated airfoil variables and parameters to the airfoil design system 104 to generate an updated wing design in accordance with one or more embodiments described herein.

The aircraft design system 502 can include a multi-disciplinary aircraft design system as described in AUTOMATIC AIRCRAFT DESIGN OPTIMIZATION BASED ON JOINT AERODYNAMIC, STRUCTURAL, AND ENERGY PERFORMANCE, U.S. patent application Ser. No. 15/840,486, which is incorporated herein by reference in its entirety. For instance, in one or more embodiments, the aircraft design system 502 utilizes initial design variables to iteratively (and jointly) modify balanced aircraft subsystems and then determine aerodynamic, structural, and energy performance metrics. In one or more embodiments, the aircraft design system 502 then applies an optimization algorithm to modify the initial design variables (and potentially other design variables) based on the determined aerodynamic, structural, and energy performance metrics. In this manner, the aircraft design system 502 can generate a modified aircraft model that reduces overall weight (and/or cost) while balancing trade-offs in competing demands for structural stability, aerodynamic performance, and energy utilization.

To illustrate, in one or more embodiments, the aircraft design system 502 identifies an input set of digital design variables of an input aircraft model. The aircraft design system 502 can then analyze structural performance, aerodynamic performance, and battery performance of the input aircraft model with the input set of design variables. For example, the aircraft design system 502 can iteratively modify ailerons, an empennage (or winglets), and/or a propulsion system of the aircraft model based on performance criteria until a balancing metric of the input aircraft model converges. Moreover, the aircraft design system 502 can determine stresses and deflections of the input aircraft model under performance loads; determine a measure of aeroelastic stability of the input aircraft model with respect to an oscillation instability mode; and determine a battery performance metric of the input aircraft model in relation to a test mission. The disclosed systems can then modify the input set of digital design variables of the input aircraft model based on the determined stresses and deflections of the aircraft model, the determined aeroelastic stability, and the determined battery performance metric of the input aircraft model.

As just mentioned, in one or more embodiments, the aircraft design system 502 iteratively modifies various subsystems of an aircraft model. In particular, in one or more embodiments, the aircraft design system 502 iteratively modifies subsystems of the aircraft model to balance the aircraft and satisfy performance criteria. For example, in one or more embodiments, the aircraft design system 502 iteratively (and jointly) modifies ailerons, an empennage (or winglets), wing location (or battery location), and/or a propulsion system. Indeed, these subsystems (or other subsystems, depending on the embodiment) of an aircraft model are generally co-dependent. For example, resizing the empennage changes overall weight and center of gravity as well as aerodynamic characteristics of the aircraft model, which in turn, impacts design of the ailerons, and the propulsion system.

Accordingly, in one or more embodiments, the aircraft design system 502 iteratively modifies these subsystems, jointly as part of an inner loop, until convergence. In particular, the aircraft design system 502 can analyze design variables to determine weight of the aircraft structure, aircraft stiffness, and weight. The aircraft design system 502 can modify the empennage and wing position to balance the aircraft (based on longitudinal stability criteria), and then capture aerodynamic performance of the aircraft to modify the propulsion system (based on performance criteria for the propulsion system) and/or ailerons (based on performance criteria for the ailerons). Moreover, the aircraft design system 502 can iterate until convergence. For example, in one or more embodiments, the aircraft design system 502 iteratively modifies these subsystems until a balancing metric (e.g., the center of gravity) converges to within a tolerance.

As discussed above, with modified subsystems that satisfy performance criteria, the aircraft design system 502 can further determine a variety of performance metrics for the aircraft model (i.e., performance metrics utilized in an outer optimization loop for the design variables). For example, the aircraft design system 502 can apply a performance load to the aircraft model and determine stresses and/or deflections in the aircraft model resulting from the performance load. Similarly, the aircraft design system 502 can determine a measure of longitudinal stability (e.g., static margin) of the aircraft model. Further, the aircraft design system 502 can determine oscillation instability modes of the aircraft model throughout the flight envelope and determine measures of aeroelastic stability (e.g., damping) of the aircraft model. Further, the aircraft design system 502 can simulate integrated performance of the aircraft model on a mission test over time and determine a battery performance metric for the mission test (e.g., an amount of battery or fuel remaining at the end of a mission or portion of a mission).

Upon determining these performance metrics, the aircraft design system 502 can then utilize the performance metrics to modify (e.g., optimize) design variables. For example, the aircraft design system 502 can utilize an optimization algorithm to modify design variables to obtain one or more objectives subject to one or more constraints. To illustrate, the aircraft design system 502 can utilize an optimization algorithm with objectives to minimize weight and/or cost of the aircraft model. Moreover, the aircraft design system 502 can utilize constraints that include aeroelastic stability constraints, stress constraints, deflection constraints, battery performance metric constraints, and/or longitudinal stability constraints. The aircraft design system 502 can repeatedly perform these steps (e.g., iteratively modifying subsystems, determining performance metrics, and optimizing design variables) to generate a new, improved aircraft model. In this manner, the aircraft design system 502 can utilize the optimization algorithm to explore the design space and optimize objectives subject to constraints guided by aerodynamic, structural, and energy performance metrics.

Figure 6:
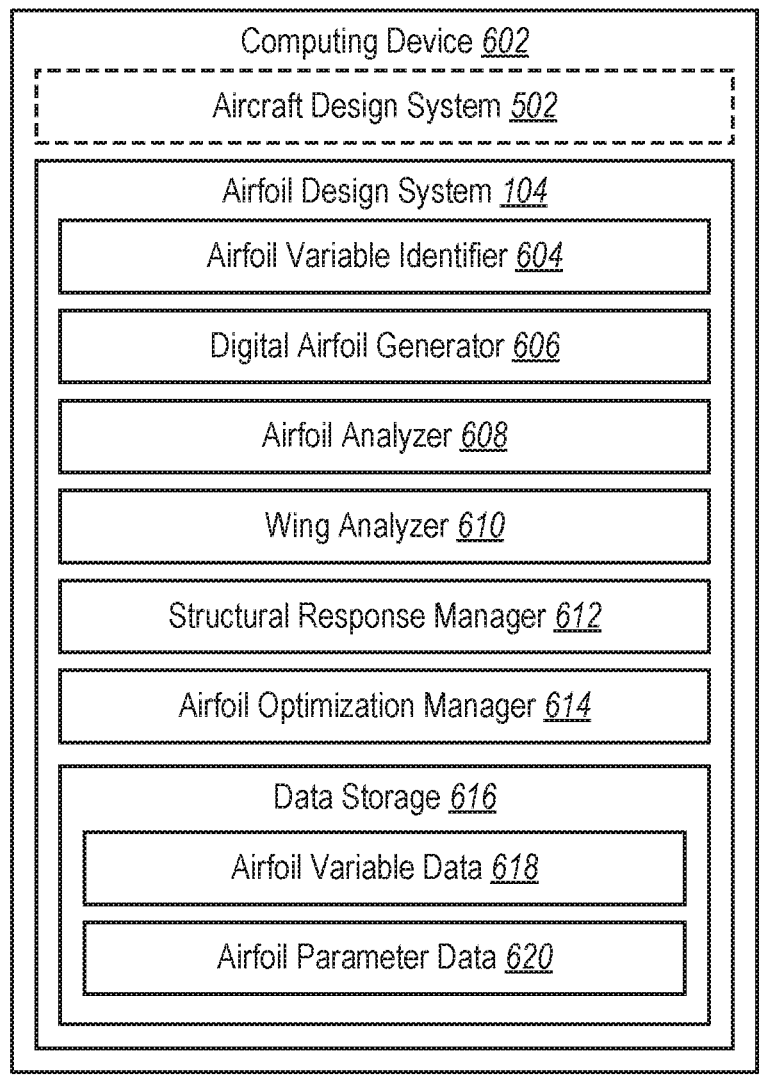
FIG. 6 illustrates an example architecture of an airfoil design system implemented on a computing device in accordance with one or more embodiments.

Proceeding onto FIG. 6, additional detail will be provided regarding various components and capabilities of the airfoil design system 104. In particular, FIG. 6 illustrates an example computing device 602 (e.g., an exemplary embodiment of the server device(s) 102 and/or the client devices 106a-106n discussed above in connection with FIG. 1). As shown in FIG. 6, the computing device 602 includes the airfoil design system 104. As further shown, the computing device 602 optionally includes an aircraft design system 502 (as described above in connection with FIG. 5). As shown in FIG. 6, the airfoil design system 104 includes an airfoil variable identifier 604, a digital airfoil generator 606, an airfoil analyzer 608, a wing analyzer 610, a structural response manager 612, an airfoil optimization manager 614, and a data storage 616 including airfoil variable data 618 and airfoil parameter data 620.

As just mentioned, and as illustrated in FIG. 6, the airfoil design system 104 includes an airfoil variable identifier 604. The airfoil variable identifier 604 can determine, identify, and/or receive airfoil variables and parameters associated with a wing design. For example, where the airfoil design system 104 receives a digital wing design, the airfoil variable identifier 604 can identify one or more stations along a span of the wing design (e.g., the root, tip, and an intermediate station between the root and tip) and identify airfoil variables for each of the stations. Alternatively, in one or more embodiments, the airfoil variable identifier 604 receives airfoil variables and associated parameters without receiving an aircraft or associated wing design.

As mentioned above, and as shown in FIG. 6, the airfoil design system 104 includes a digital airfoil generator 606. In one or more embodiments, the digital airfoil generator 606 creates, models, and/or generates a digital airfoil representative of the identified airfoil variables for one or more airfoils. In one or more embodiments, the digital airfoil generator 606 generates the digital airfoil by utilizing XFOIL or another airfoil performance algorithm. In addition, the digital airfoil generator 606 can further refine (e.g., smooth) a shape of the digital airfoil by utilizing a CST parameterization method that defines the basic shape of the airfoil in accordance with a shape function.

As further shown in FIG. 6, the airfoil design system 104 includes an airfoil analyzer 608. In one or more embodiments, the airfoil analyzer 608 determines, calculates, and/or generates an airfoil performance for each of the identified airfoils and based on the airfoil variables and associated parameters. As discussed above, in one or more embodiments, the airfoil analyzer 608 determines an airfoil aerodynamic performance metric (e.g., a cross-sectional aerodynamic performance metric of a cross-section corresponding to an airfoil). In addition, the airfoil analyzer 608 can determine an airfoil structural performance metric (e.g., a cross-sectional structural stiffness of the cross-section corresponding to the airfoil).

As further shown in FIG. 6, the airfoil design system 104 includes a wing analyzer 610. In one or more embodiments, the wing analyzer 610 determines one or more wing metrics based on the determined airfoil performance metrics. For example, in one or more embodiments, the wing analyzer 610 determines an aerodynamic performance metric over a span of the wing. The wing analyzer 610 can further determine a deformation metric over the span of the wing based at least in part on the aerodynamic performance metric.

As discussed above, in one or more embodiments, the wing analyzer 610 iteratively determines the aerodynamic performance metric over the span of the wing and the deformation metric over the span of the wing any number of times until converging to an equilibrium aerodynamic performance metric corresponding to an equilibrium deformation metric. In particular, based on the deformation of the wing, the wing analyzer 610 can determine a modified aerodynamic metric, which in turn affects the deformation of the wing. Accordingly, the wing analyzer 610 can determine the deformation metric and aerodynamic metric over the span of the wing multiple times until a difference between iterations converges within a threshold or until the wing analyzer 610 has performed a predefined number of iterations.

As further shown, the airfoil design system 104 includes a structural response manager 612. In one or more embodiments, the structural response manager 612 determines a specific strength at one or more locations along the span of the wing. For example, the structural response manager 612 can determine a specific strength at a root and/or tip of the wing based on a distributed load over the wing and further based on a structural stiffness at the root and/or tip of the wing. In one or more embodiments, the structural response manager 612 determines the specific strength at a particular station of the wing by determining an incremental increase in load that will cause a structure of the wing at the station to fail.

The airfoil design system 104 can further include an airfoil optimization manager 614. In one or more embodiments, the airfoil optimization manager 614 implements an optimization algorithm that determines modified airfoil variables and parameters that accomplishes one or more objectives (e.g., decreasing weight of the aircraft) while satisfying one or more constraints. For example, the airfoil optimization manager 614 can receive one or more outputs generated by the airfoil analyzer 608, wing analyzer 610, and structural response manager 612 and determine modified airfoil variables that decrease a weight of the aircraft while satisfying one or more constraints (e.g., a threshold pitching moment constraint, a turbulence robustness constraint, stiffness and/or strength constraints).

As further shown in FIG. 6, the airfoil design system 104 includes a data storage 616 including airfoil variable data 618. The variable data 618 can include any information associated with airfoil shapes and/or structures. For example, variable data 618 can include digital design variables including a camber (e.g., a maximum camber), a thickness (e.g., a maximum thickness), a leading-edge radius, wing twists, and one or more positions along a chord of the airfoil corresponding to a maximum camber and/or a maximum thickness of the airfoil. The airfoil data 618 can further include information about structural variables including plies, tapers, and web thickness at respective airfoils. The airfoil data 618 can further include a location of the respective airfoils along the span of a wing.

The data storage 616 further includes airfoil parameter data 620. Airfoil parameter data 620 can include information about the wing and airfoils including, for example, an initial airfoil, wing geometry, and operating conditions. Airfoil parameter data 620 can further include information about the material and laminates used for a particular wing design. Accordingly, the parameter data 620 can include properties of materials and/or laminates used in connection with the wing design.

Each of the components 604-620 of the airfoil design system 104 and their corresponding elements may be in communication with one another using any suitable communication technologies. It will be recognized that although components 604-620 and their corresponding elements are shown to be separate in FIG. 6, any of components 604-620 and their corresponding elements may be combined into fewer components, such as into a single facility or module, divided into more components, or configured into different components as may serve a particular embodiment.

The components 604-620 and their corresponding elements can comprise software, hardware, or both. For example, the components 604-620 and their corresponding elements can comprise one or more instructions stored on a computer-readable storage medium and executable by processors of one or more computing devices. The components 604-620 and their corresponding elements can comprise hardware, such as a special purpose processing device to perform a certain function or group of functions. Additionally, or alternatively, the components 604-620 and their corresponding elements can comprise a combination of computer-executable instructions and hardware.

Furthermore, the components 604-620 of the airfoil design system 104 may, for example, be implemented as one or more stand-alone applications, as one or more modules of an application, as one or more plug-ins, as one or more library functions or functions that may be called by other applications, and/or as a cloud-computing model. Thus, the components 604-620 of the airfoil design system 104 may be implemented as a stand-alone application, such as a desktop or mobile application. Furthermore, the components 604-620 of the airfoil design system 104 may be implemented as one or more web-based applications hosted on a remote server. Alternatively, or additionally, the components of the airfoil design system 104 may be implemented in a suit of mobile device applications or "apps."

Figure 7:
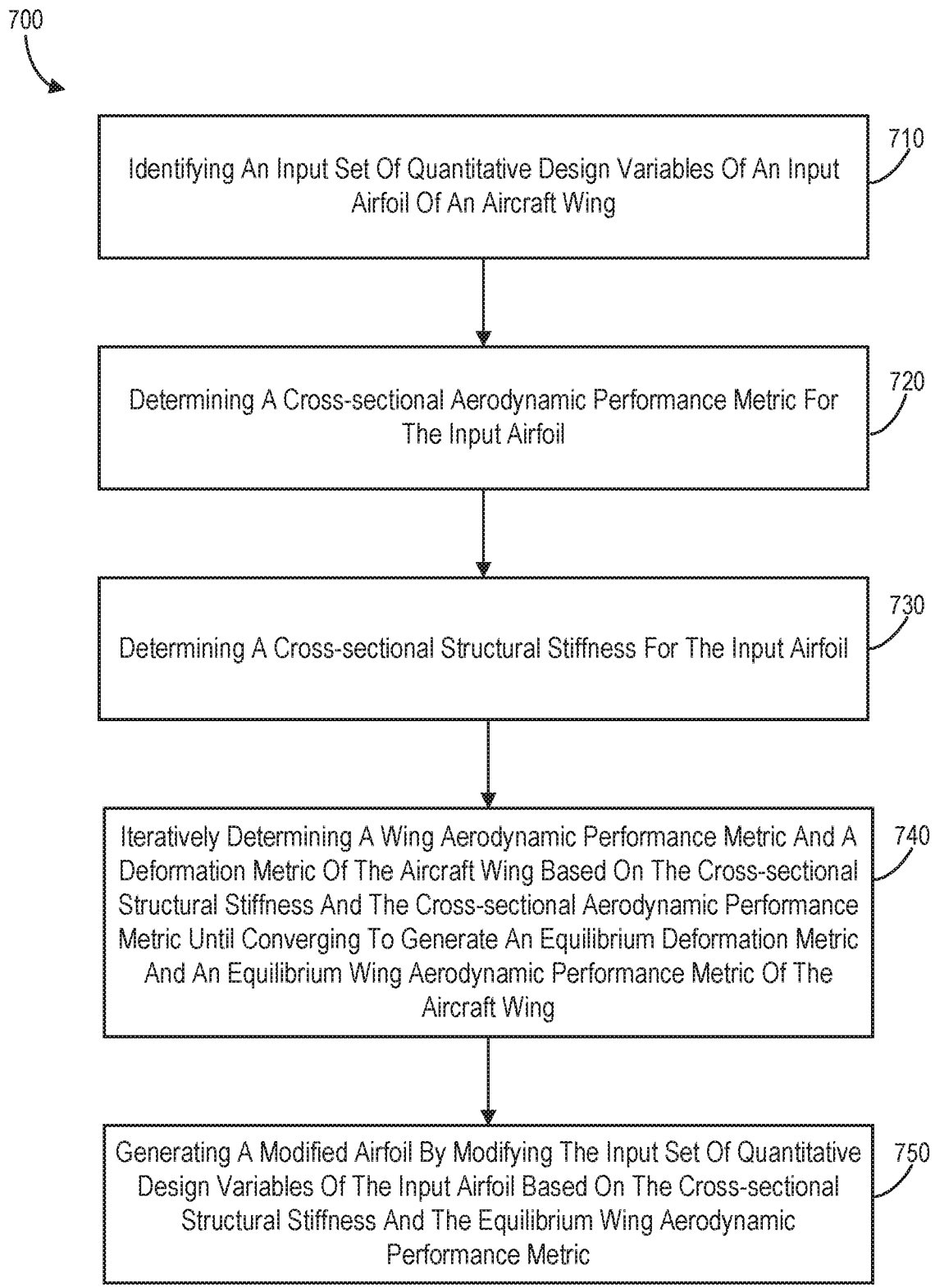
FIG. 7 illustrates a flowchart of a series of acts for optimizing an airfoil design in accordance with one or more embodiments.

Turning now to FIG. 7, this FIG. illustrates a flowchart of a series of acts 700 of generating a modified airfoil for a wing design in accordance with one or more embodiments. While FIG. 7 illustrates acts according to one or more embodiments, alternative embodiments may omit, add to, reorder, and/or modify any of the acts shown in FIG. 7. The acts of FIG. 7 can be performance as part of a method. Alternatively, a non-transitory computer readable medium can comprise instructions, that when executed by one or more processors, cause a computing device to perform the acts of FIG. 7. In still further embodiments, a system can perform the acts of FIG. 7.

As shown in FIG. 7, the series of acts 700 includes an act 710 of identifying an input set of quantitative design variables of an input airfoil of an aircraft wing. For example, in one or more embodiments, the act 710 includes identifying an input set of quantitative design variables of an input airfoil corresponding to an aircraft wing. In one or more embodiments, the quantitative design variables of the input airfoil include at least one of a maximum thickness, a maximum camber, a position of maximum thickness along a chord of the cross-section, a position of maximum camber along the chord of the cross-section, or a leading edge radius.

As further shown in FIG. 7, the series of acts 700 includes an act 720 of determining a cross-sectional aerodynamic performance metric for the input airfoil. For example, in one or more embodiments, the act 720 includes determining a cross-sectional aerodynamic performance metric of a cross-section of the aircraft wing corresponding to the input airfoil. In one or more embodiments, determining the cross-sectional aerodynamic performance metric includes at least one of determining a lift coefficient, a pitching moment coefficient, a drag coefficient, or a lift to drag ratio.

As further shown in FIG. 7, the series of acts 700 includes an act 730 of determining a cross-sectional structural stiffness for the input airfoil. For example, in one or more embodiments, the act 730 includes determining a cross-sectional structural stiffness of the cross-section of the aircraft wing corresponding to the input airfoil.

As further shown, the series of acts 700 includes an act 740 of iteratively determining a wing aerodynamic performance metric and a deformation metric of the aircraft wing based on the cross-sectional structural stiffness and the cross-sectional aerodynamic performance metric until converging to generate an equilibrium deformation metric and an equilibrium wing aerodynamic performance metric of the aircraft wing. For example, in one or more embodiments, the act 740 includes iteratively determining a wing aerodynamic performance metric over a span of the aircraft wing and a deformation metric over the span of the aircraft wing based on the cross-sectional structural stiffness and the cross-sectional aerodynamic performance metric until converging to generate an equilibrium deformation metric of the aircraft wing corresponding to an equilibrium wing aerodynamic performance metric of the aircraft wing.

As further shown, the series of acts 700 includes an act 740 of generating a modified airfoil by modifying the input set of quantitative design variables of the input airfoil based on the cross-sectional structural stiffness and the equilibrium wing aerodynamic performance metric. For example, in one or more embodiments, the act 740 includes generating a modified airfoil by modifying the input set of quantitative design variables of the input airfoil based on the cross-sectional structural stiffness and the equilibrium wing aerodynamic performance metric of the aircraft wing. In one or more embodiments, modifying the input set of quantitative design variables includes utilizing an optimization algorithm having one or more objectives and one or more constraints to determine modifications to the input set of quantitative design variables of the input airfoil. In one or more embodiments, the one or more objectives includes reducing a weight of the aircraft wing.

In one or more embodiments, the series of acts 700 further includes determining an equilibrium stress across the aircraft wing based on the cross-sectional structural stiffness of the cross-section of the aircraft wing corresponding to the input airfoil and further based on the equilibrium wing aerodynamic performance metric of the aircraft wing. The series of acts 700 can further include determining, based on the equilibrium stress across the aircraft wing, a structural strength of the aircraft wing corresponding to the input airfoil. In addition, the series of acts 700 can further include modifying the input set of quantitative design variables of the input airfoil based on the determined structural strength of the aircraft wing, the cross-sectional structural stiffness, and the equilibrium wing aerodynamic performance metric of the aircraft wing.

In one or more embodiments, the series of acts 700 includes determining a structural weight of the aircraft wing and determining a performance weight of the aircraft wing based on the equilibrium wing aerodynamic performance metric of the aircraft wing. In addition, the one or more objectives for reducing the weight of the wing can include reducing the structural weight of the aircraft wing and reducing the performance weight of the aircraft wing. In one or more embodiments, determining the performance weight of the aircraft wing includes determining an amount of energy required for operation of the aircraft over a flight mission based on the equilibrium wing aerodynamic performance metric of the aircraft wing.

In one or more embodiments, determining the equilibrium wing aerodynamic performance metric comprises determining a pitching moment. In addition, in one or more embodiments, the series of acts includes determining a first polar at a first turbulence level and a second polar at a second turbulence level. Further, in one or more embodiments, the one or more constraints include a threshold pitching moment for the modified airfoil and a threshold difference in profile drag of the modified airfoil at the first turbulence level and the second turbulence level.

In one or more embodiments, the series of acts 700 include determining a structural strength of the aircraft wing corresponding to the input airfoil based on the cross-sectional structural stiffness of the cross-section of the aircraft wing corresponding to the input airfoil and the equilibrium wing aerodynamic performance metric of the aircraft wing. In addition, the one or more constraints can include a threshold strength and a threshold stiffness.

In one or more embodiments, the series of acts includes receiving an aircraft design generated using an aircraft design algorithm, the aircraft design comprising an aircraft wing design. The series of acts 700 can further include identifying the input set of quantitative design variables of the input airfoil from the aircraft wing design. In one or more embodiments, the series of acts 700 includes, upon generating the modified airfoil, providing the modified airfoil to the aircraft design algorithm for generating a modified aircraft design. Further in one or more embodiments, the series of acts 700 include generating the one or more constraints (e.g., of the optimization algorithm) based on the received aircraft design such that the modified airfoil can be utilized in the received aircraft design.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
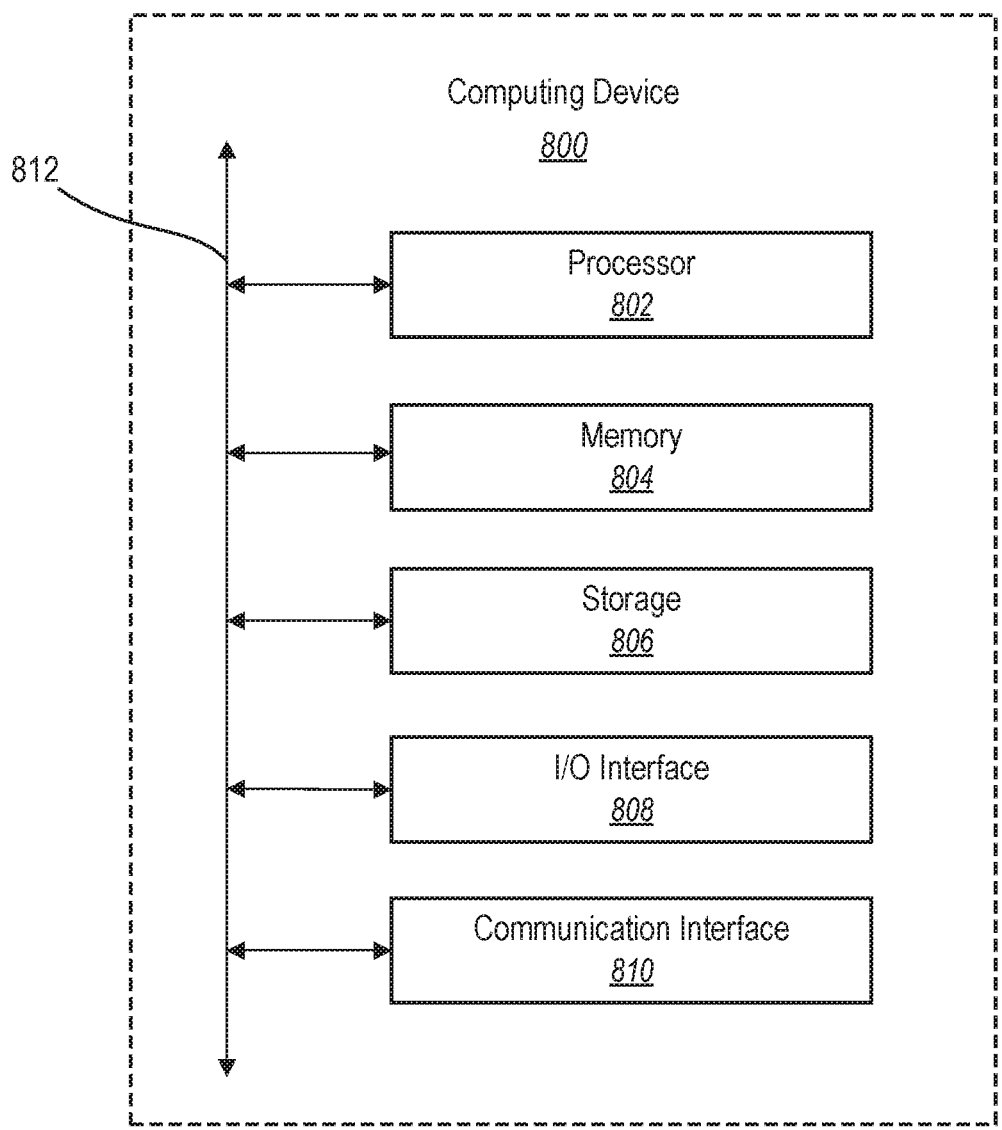
FIG. 8 illustrates a block diagram of a computing device in accordance with one or more embodiments.

FIG. 8 illustrates a block diagram of exemplary computing device 800 that may be configured to perform one or more of the processes described above. One will appreciate that one or more computing devices such as the computing device 800 may implement one or more components of the airfoil design system 104. As shown by FIG. 8, the computing device 800 can comprise a processor 802, a memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example, and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example, and not by way of limitation, the processor 802 may include one or more instruction caches, one or more data caches, and one or more translation lookaside buffers (TLBs). Instructions in the instruction caches may be copies of instructions in the memory 804 or the storage device 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 804 may be internal or distributed memory.

The storage device 806 includes storage for storing data or instructions. As an example, and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example, and not by way of limitation, the communication interface 810 may include a network interface controller (MC) or network adapter for communicating with an Ethernet or other wire-based network or a wireless NIC (WNIC) or wireless adapter for communicating with a wireless network, such as a WI-FI.

Additionally or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MIMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method comprising:
    identifying an input set of cross-sectional quantitative design variables of an input airfoil corresponding to an aircraft wing, wherein the cross-sectional quantitative design variables comprise at least one of a camber, a thickness, a leading edge radius, or a wing twist;
    determining a cross-sectional aerodynamic performance metric of a cross-section of the aircraft wing corresponding to the input airfoil;
    determining a cross-sectional structural stiffness of the cross-section of the aircraft wing corresponding to the input airfoil;
    iteratively determining a wing aerodynamic performance metric over a span of the aircraft wing and a deformation metric over the span of the aircraft wing based on the cross-sectional structural stiffness and the cross-sectional aerodynamic performance metric until converging to generate an equilibrium deformation metric of the aircraft wing corresponding to an equilibrium aerodynamic performance metric of the aircraft wing;
    determining a structural strength of the aircraft wing by:
        determining first equilibrium stresses at a wing root and a wing tip utilizing the equilibrium aerodynamic performance metric and corresponding to a measurement of internal force applied at the wing under equilibrium deformation and load conditions;
        determining second equilibrium stresses at additional localized wing stations by determining lamina level stresses at the additional localized wing stations based on the cross-sectional structural stiffness of the cross-section of the aircraft wing; and
        determining the structural strength of the aircraft wing as a remaining effective strength at the wing root, the wing tip, and the additional localized stations under the first equilibrium stresses and the second equilibrium stresses; and
    generating a modified airfoil by processing the cross-sectional structural stiffness, the structural strength, and the equilibrium aerodynamic performance metric of the aircraft wing utilizing an optimization algorithm to generate a modified set of cross-sectional quantitative design variables comprising at least one of a modified camber, a modified, thickness, a modified leading edge radius, or a modified wing twist.

2. The method of claim 1, wherein determining the second equilibrium stresses is further based on the equilibrium aerodynamic performance metric of the aircraft wing.

3. The method of claim 1, wherein generating the modified airfoil comprises utilizing one or more objectives and one or more constraints of the optimization algorithm to determine the modified set of cross-sectional quantitative design variables, wherein the one or more objectives comprises reducing a weight of the aircraft wing.

4. The method of claim 3,
    further comprising:
        determining a structural weight of the aircraft wing; and
        determining a performance weight of the aircraft wing based on the equilibrium aerodynamic performance metric of the aircraft wing; and
    wherein the one or more objectives for reducing the weight of the wing comprises reducing the structural weight of the aircraft wing and reducing the performance weight of the aircraft wing.

5. The method of claim 4, wherein determining the performance weight of the aircraft wing comprises determining an amount of energy required for operation of the aircraft over a flight mission based on the equilibrium aerodynamic performance metric of the aircraft wing.

6. The method of claim 3:
    wherein determining the equilibrium aerodynamic performance metric comprises determining a pitching moment; and
    further comprising determining a first polar at a first turbulence level and a second polar at a second turbulence level; and
    wherein the one or more constraints comprises:
        a threshold pitching moment for the modified airfoil; and
        a threshold difference in profile drag of the modified airfoil at the first turbulence level and the second turbulence level.

7. The method of claim 3, wherein the one or more constraints comprises a threshold structural strength and a threshold stiffness.

8. The method of claim 3, further comprising:
    receiving an aircraft design generated using an aircraft design algorithm, the aircraft design comprising an aircraft wing design;
    identifying the input set of cross-sectional quantitative design variables of the input airfoil from the aircraft wing design; and
    upon generating the modified airfoil, providing the modified airfoil to the aircraft design algorithm for generating a modified aircraft design.

9. The method of claim 8, further comprising generating the one or more constraints based on the received aircraft design such that the modified airfoil can be utilized in the received aircraft design.

10. The method of claim 1, wherein determining the cross-sectional aerodynamic performance metric comprises at least one of determining a lift coefficient, a pitching moment coefficient, a drag coefficient, or a lift to drag ratio.

11. A system comprising:
    at least one processor; and
    at least one non-transitory computer readable storage medium storing instructions that, when executed by the at least one processor, cause the system to:
        identify an input set of cross-sectional quantitative design variables of an input airfoil corresponding to an aircraft wing, wherein the cross-sectional quantitative design variables comprise at least one of a camber, a thickness, a leading edge radius, or a wing twist;
        determine a cross-sectional aerodynamic performance metric of a cross-section of the aircraft wing corresponding to the input airfoil;

determine a cross-sectional structural stiffness of the cross-section of the aircraft wing corresponding to the input airfoil;

iteratively determine a wing aerodynamic performance metric over a span of the aircraft wing and a deformation metric over the span of the aircraft wing based on the cross-sectional structural stiffness and the cross-sectional aerodynamic performance metric until converging to generate an equilibrium deformation metric of the aircraft wing corresponding to an equilibrium aerodynamic performance metric of the aircraft wing;

determine a structural strength of the aircraft wing by:
determining first equilibrium stresses at a wing root and a wing tip utilizing the equilibrium aerodynamic performance metric and corresponding to a measurement of internal force applied at the wing under equilibrium deformation and load conditions;

determining second equilibrium stresses at additional localized wing stations by determining lamina level stresses at the additional localized wing stations based on the cross-sectional structural stiffness of the cross-section of the aircraft wing; and determining the structural strength of the aircraft wing as a remaining effective strength at the wing root, the wing tip, and the additional localized stations under the first equilibrium stresses and the second equilibrium stresses; and generate a modified airfoil by processing the cross-sectional structural stiffness, the structural strength, and the equilibrium aerodynamic performance metric of the aircraft wing utilizing an optimization algorithm to generate a modified set of cross-sectional quantitative design variables comprising at least one of a modified camber, a modified, thickness, a modified leading edge radius, or a modified wing twist.

12. The system of claim 11, further comprising instructions that, when executed by the at least one processor, cause the system to:
further determine the second equilibrium stresses based on the equilibrium aerodynamic performance metric of the aircraft wing.

13. The system of claim 11, further comprising instructions that, when executed by the at least one processor, cause the system to generate the modified airfoil by utilizing one or more objectives and one or more constraints of the optimization algorithm to determine the modified set of cross-sectional quantitative design variables, wherein the one or more objectives comprises reducing a weight of the aircraft wing.

14. The system of claim 13, further comprising instructions that, when executed by the at least one processor, cause the system to:
determine a structural weight of the aircraft wing;
determine a performance weight corresponding to an amount of energy required for operation of the aircraft over a flight mission based on the equilibrium aerodynamic performance metric of the aircraft wing; and
wherein the one or more objectives for reducing the weight of the wing comprises reducing the structural weight of the aircraft wing and reducing the performance weight of the aircraft wing.

15. The system of claim 13, further comprising instructions that, when executed by the at least one processor, cause the system to:
determine the equilibrium aerodynamic performance metric by determining a pitching moment;
determine a first polar at a first turbulence level and a second polar at a second turbulence level,
wherein the one or more constraints comprises:
a threshold pitching moment for the modified airfoil;
a threshold difference in profile drag of the modified airfoil at the first turbulence level and the second turbulence level; and
a threshold structural strength and a threshold stiffness.

16. A non-transitory computer-readable medium storing instructions thereon that, when executed by at least one processor, cause a computer system to:
identify an input set of cross-sectional quantitative design variables of an input airfoil corresponding to an aircraft wing, wherein the cross-sectional quantitative design variables comprise at least one of a camber, a thickness, a leading edge radius, or a wing twist;
determine a cross-sectional aerodynamic performance metric of a cross-section of the aircraft wing corresponding to the input airfoil;
determine a cross-sectional structural stiffness of the cross-section of the aircraft wing corresponding to the input airfoil;
iteratively determine a wing aerodynamic performance metric over a span of the aircraft wing and a deformation metric over the span of the aircraft wing based on the cross-sectional structural stiffness and the cross-sectional aerodynamic performance metric until converging to generate an equilibrium deformation metric of the aircraft wing corresponding to an equilibrium aerodynamic performance metric of the aircraft wing;
determine a structural strength of the aircraft wing by:
determining first equilibrium stresses at a wing root and a wing tip utilizing the equilibrium aerodynamic performance metric and corresponding to a measurement of internal force applied at the wing under equilibrium deformation and load conditions;
determining second equilibrium stresses at additional localized wing stations by determining lamina level stresses at the additional localized wing stations based on the cross-sectional structural stiffness of the cross-section of the aircraft wing; and
determining the structural strength of the aircraft wing as a remaining effective strength at the wing root, the wing tip, and the additional localized stations under the first equilibrium stresses and the second equilibrium stresses; and
generate a modified airfoil by processing the cross-sectional structural stiffness, the structural strength, and the equilibrium aerodynamic performance metric of the aircraft wing utilizing an optimization algorithm to generate a modified set of cross-sectional quantitative design variables comprising at least one of a modified camber, a modified, thickness, a modified leading edge radius, or a modified wing twist.

17. The non-transitory computer-readable medium of claim 16, further comprising instructions that, when executed by the at least one processor, cause the computer system to:
further determine the second equilibrium stresses based on the equilibrium aerodynamic performance metric of the aircraft wing.

18. The non-transitory computer-readable medium of claim 16, further comprising instructions that, when executed by the at least one processor, cause the computer system to generate the modified airfoil by utilizing one or more objectives and one or more constraints of the optimization algorithm to determine the modified set of cross-sectional quantitative design variables, wherein the one or more objectives comprises reducing a weight of the aircraft wing.

19. The non-transitory computer-readable medium of claim 18, further comprising instructions that, when executed by the at least one processor, cause the computer system to:
determine a structural weight of the aircraft wing;
determine a performance weight corresponding to an amount of energy required for operation of the aircraft over a flight mission based on the equilibrium aerodynamic performance metric of the aircraft wing; and
wherein the one or more objectives for reducing the weight of the wing comprises reducing the structural weight of the aircraft wing and reducing the performance weight of the aircraft wing.

20. The non-transitory computer-readable medium of claim 18, further comprising instructions that, when executed by the at least one processor, cause the computer system to:
determine the equilibrium aerodynamic performance metric by determining a pitching moment;
determine a first polar at a first turbulence level and a second polar at a second turbulence level,
wherein the one or more constraints comprises:
a threshold pitching moment for the modified airfoil;
a threshold difference in profile drag of the modified airfoil at the first turbulence level and the second turbulence level; and
a threshold structural strength and a threshold stiffness.

* * * * *